United States Patent [19]

Hayashi et al.

[11] Patent Number: 4,916,901
[45] Date of Patent: Apr. 17, 1990

[54] SWASHPLATE TYPE VARIABLE DISPLACEMENT HYDRAULIC DEVICE

[75] Inventors: Tsutomu Hayashi; Yoshihiro Nakajima, both of Tokyo; Takushi Matsuto, Saitama; Mitsuru Saito, Tokyo; Kenji Sakakibara; Katsumi Yamazaki, both of Saitama; Nobuyuki Yakigaya, Chiba; Kazuhiko Nakamura, Kanagawa, all of Japan

[73] Assignee: Honda Giken Kogyo Kabushiki Kaisha, Tokyo, Japan

[21] Appl. No.: 215,197

[22] Filed: Jul. 5, 1988

[30] Foreign Application Priority Data

| Jul. 3, 1987 | [JP] | Japan | 62-166735 |
| Sep. 30, 1987 | [JP] | Japan | 62-247677 |
| Mar. 2, 1988 | [JP] | Japan | 63-49399 |

[51] Int. Cl.$^4$ ............................................. F16D 39/00
[52] U.S. Cl. .................................... 60/489; 60/487; 91/506; 92/12.2; 92/57
[58] Field of Search ................ 91/506, 505, 504; 92/12.2, 57, 71; 417/222; 60/487, 488, 489, 490, 491, 492

[56] References Cited

U.S. PATENT DOCUMENTS

| Re. 31,107 | 12/1982 | Kass et al. | 91/506 X |
| 1,274,391 | 8/1918 | Davis . | |
| 1,533,399 | 4/1925 | Dunlap . | |
| 1,857,000 | 5/1932 | Kleschka | 91/505 X |
| 2,307,719 | 1/1943 | Hawley | 91/505 X |
| 2,832,198 | 4/1958 | Pichon | 60/492 |
| 2,844,002 | 7/1958 | Pavesi | 60/325 |
| 3,092,034 | 6/1963 | Bartholomaus . | |
| 3,230,699 | 1/1966 | Hann . | |
| 3,535,984 | 10/1970 | Anderson . | |
| 3,570,246 | 3/1971 | Briggs | 60/492 |
| 3,733,970 | 5/1973 | Bosch | 417/217 X |
| 3,747,476 | 7/1973 | Ankeny et al. | 91/506 X |
| 4,167,855 | 9/1979 | Knapp | 60/487 X |
| 4,381,701 | 5/1983 | Maistrelli | 60/464 X |
| 4,735,050 | 4/1988 | Hayashi . | |
| 4,741,251 | 3/1988 | Hayashi et al. | 91/506 X |
| 4,745,748 | 5/1988 | Hayashi . | |
| 4,748,898 | 6/1988 | Hayashi . | |
| 4,781,022 | 11/1988 | Hayashi . | |

FOREIGN PATENT DOCUMENTS

| 475572 | 7/1951 | Canada | 60/487 |
| 0186500 | 7/1986 | European Pat. Off. . | |
| 0206550 | 12/1986 | European Pat. Off. . | |
| 0209286 | 1/1987 | European Pat. Off. . | |
| 0243004 | 10/1987 | European Pat. Off. . | |
| 1500480 | 7/1969 | Fed. Rep. of Germany . | |
| 2456473 | 8/1976 | Fed. Rep. of Germany . | |
| 56-143856 | 9/1981 | Japan . | |
| 61-153057 | 7/1986 | Japan . | |
| 62-167970 | 7/1987 | Japan . | |
| 62-224770 | 10/1987 | Japan . | |
| 1521494 | 8/1978 | United Kingdom . | |

Primary Examiner—Edward K. Look
Attorney, Agent, or Firm—Lyon & Lyon

[57] ABSTRACT

A swashplate type variable displacement hydraulic device is so constructed that a plurality of plungers are slidably received in a plurality of cylinder bores arranged annularly around an axis of rotation, a back surface of a swashplate of which a fore surface is engaged by outer ends of the plungers is supported by a swashplate holder via bearing means, and a stationary swashplate anchor supports the swashplate holder to turn about a trunnion axis which intersects the axis of rotation at right angles. Opposing surfaces of the swashplate holder and swashplate anchor are formed as spherical surfaces of which a center is located at a position where the axis of rotation intersects the trunnion axis, the swashplate holder has a pair of trunnion shafts projected from opposite ends of the swashplate holder while extending along the trunnion axis, and the trunnion anchor is formed at opposite ends thereof with recesses with which the trunnion shafts are rotatably engaged.

20 Claims, 16 Drawing Sheets

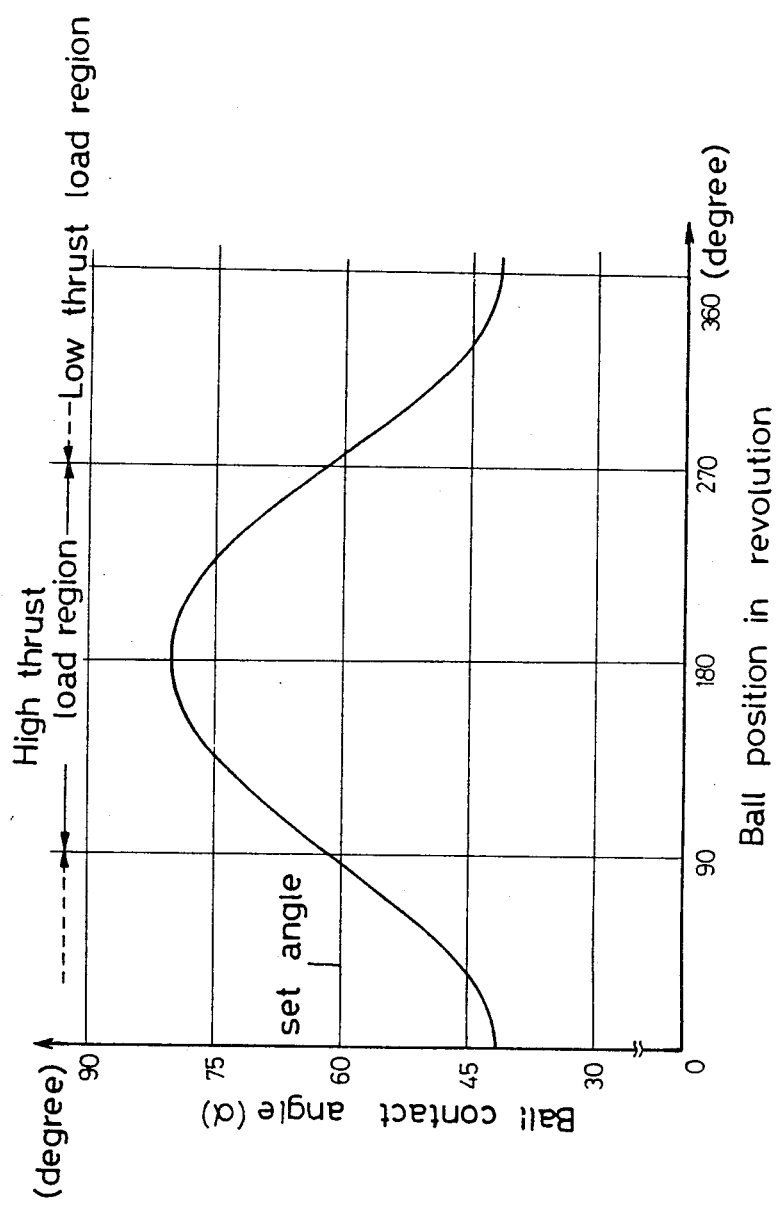

SWASHPLATE TYPE VARIABLE DISPLACEMENT HYDRAULIC DEVICE

BACKGROUND OF THE INVENTION

1. Field of the Invention

The present invention relates to a swashplate type variable displacement hydraulic device applied to a hydraulic pump or motor, and more particularly, to a device comprising a cylinder having a plurality of cylinder bores annularly arranged to extend in parallel with an axis of rotation and surround said axis of rotation, said cylinder being rotatable about the axis of rotation, a plurality of plungers slidably received in said cylinder bores, a swashplate having a force surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder.

2. Description of the Prior Art

As a hydraulic device of the aforementioned type, there is heretofore known a hydraulic device which is so constructed that a surface of a swashplate holder and a surface of a swashplate anchor located opposite to the surface of the swashplate holder are contoured in the form of a cylindrical surface, and trunnion shafts adapted to be rotatably supported by means of the swashplate anchor on an axis of the trunnion shafts are provided at both ends of the swashplate holder (for instance, see Japanese Laid-Open Patent No. 153057/1986).

With respect to the conventional hydraulic device, it has been found that a lateral pressure is developed between the swashplate holder and the swashplate anchor due to an eccentric load exerted on the swashplate via each plunger and thereby a rotational resistance of the swashplate holder increases.

SUMMARY OF THE INVENTION

The present invention has been made with the foregoing background in mind and its object resides in providing a swashplate type variable displacement hydraulic device which assures that no lateral pressure is developed between a swashplate holder and a swashplate anchor so that the swashplate holder can lightly be turned.

To accomplish the above objects, the present invention provides a swashplate type variable displacement hydraulic device of the above-mentioned type, wherein said swashplate holder and said swashplate anchor have surfaces opposed to each other, said opposed surfaces being formed as spherical surfaces of which center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor.

With the above construction, a thrust load exerted on the swashplate from a group of plungers are borne by the swashplate anchor via the swashplate holder. At this moment, the swashplate holder exhibits an aligning function by virtue of a spherical contact between the swashplate holder and the swashplate anchor so that the center of the spherical surface of the holder is located on the axis of rotation of the cylinder at all times. This leads to a result that the swashplate holder can be rotated lightly and the displacement of the hydraulic device can be adjusted easily at all times without any lateral pressure developed between the swashplate holder and the swashplate anchor.

In addition, rotation of the swashplate holder about an axis other than the trunnion axis can be inhibited under the effect of engagement of the trunnion shafts on the swashplate holder with the recesses on the swashplate anchor regardless of how a spherical contact is made between the swashplate holder and the swashplate anchor. Another advantageous effect is that the assembling of both the members can be achieved easily.

These and other objects, features and advantages of the present invention will become readily apparent from a reading of the following description which has been prepared in conjunction with the accompanying drawings.

BRIEF DESCRIPTION OF THE DRAWINGS

The present invention will be illustrated in the following drawings in which,

FIG. 1 is a plan view schematically illustrating a power unit for a motorcycle, FIG. 2 is an enlarged vertical sectional view illustrating essential parts as shown in FIG. 1, FIG. 3 is a sectional view taken along a line III—III in FIG. 2, FIG. 4 is a sectional view taken along a line IV—IV in FIG. 3, FIG. 5 is a sectional view taken along a line V—V in FIG. 3, illustrating a clutch ON state, FIG. 6 is a sectional view similar to FIG. 5, illustrating a clutch OFF state, FIG. 7 is a front view of a distributing valve, FIG. 8 is a sectional view of the distributing valve taken along a line VIII—VIII in FIG. 7, FIG. 9 is an enlarged sectional view of the essential parts as shown in FIG. 3, FIG. 10 is a sectional view taken along a line X—X in FIG. 3, FIG. 11 is a plan view of a motor swashplate, FIG. 12 is a sectional view taken along a line XII—XII in FIG. 11, FIG. 13 is an enlarged fragmentary sectional view taken along a circumferentially extending line XIII—XIII in FIG. 11, FIG. 14 is a perspective view of the essential parts in FIG. 2, shown in a disassembled state, FIG. 15 is a fragmental sectional view taken along a line XV—XV in FIG. 2, FIG. 16 is a fragmental sectional view taken in a line XVI—XVI in FIG. 2, FIG. 17 is a sectional view taken along a line XVII—XVII in FIG. 16, FIG. 18 is a perspective view of essential parts in FIGS. 15 and 16, shown in a disassembled state, FIG. 19 is an enlarged sectional view of an angular contact ball bearing employed for the hydraulic pump, FIG. 20 is a plan view illustrating a relationship between a retainer and balls, FIG. 23 is a graph illustrating characteristics with respect to variation in contact angle between adjacent balls during eccentric load operation.

DESCRIPTION OF THE PREFERRED EMBODIMENT

Now, the present invention will be described in a greater detail hereinafter with reference to the accompanying drawings which illustrate a preferred embodiment thereof.

Figure 1:
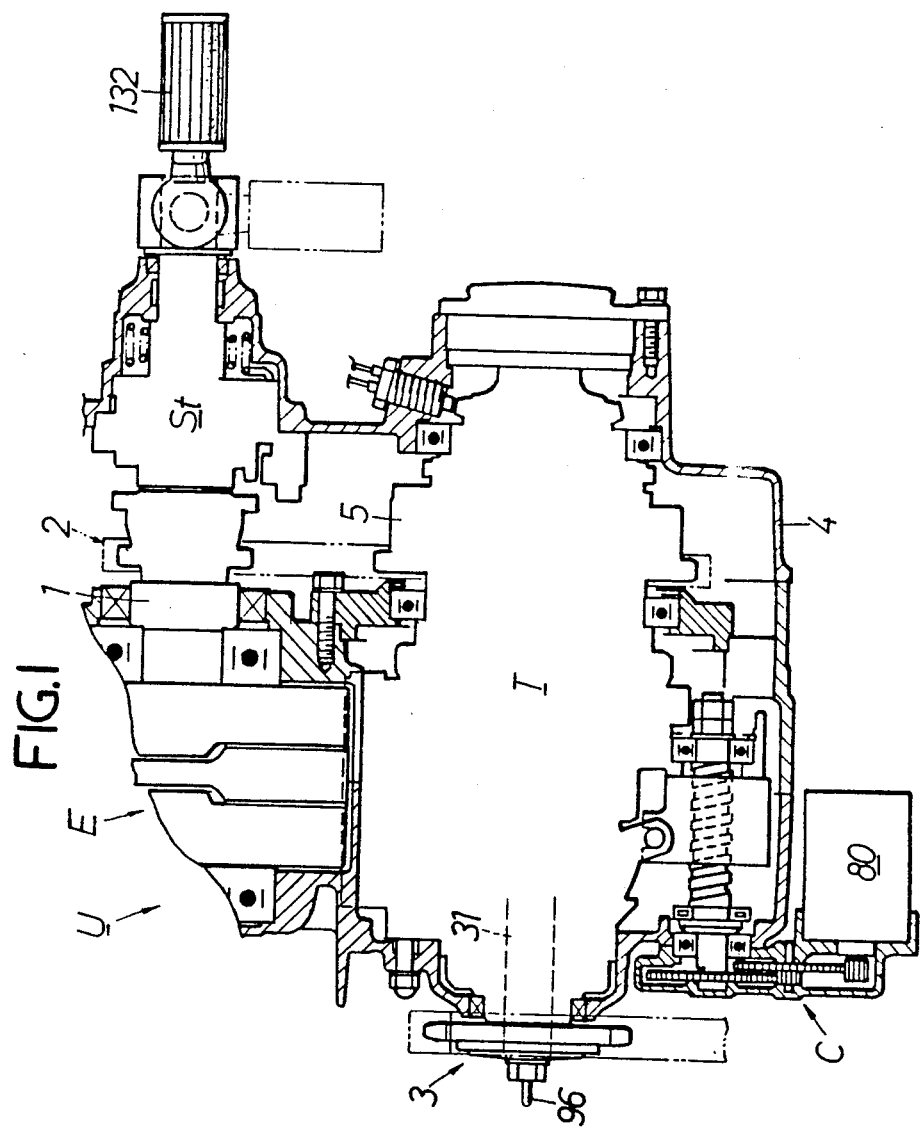
FIGS. 1 to 20 illustrate a hydraulic device in accordance with an embodiment of the present invention.

Referring first to FIG. 1, a power unit U for a motorcycle is comprised of an engine E and a hydrostatic continuously variable transmission T, and a crankshaft 1 of the engine E and the transmission T are accommodated in a common casing 4. The transmission T includes a sleeve-shaped input shaft 5 and an output shaft 31 serving as a transmission shaft both of which are arranged in parallel with the crankshaft 1. The crankshaft 1 drives the input shaft 5 via a primary reduction device 2, while the output shaft 31 drives a rear wheel (not shown) of the motorcycle via a secondary reduction device 3.

A kick type starter St is disposed adjacent to the right-hand end of the crankshaft 1 as viewed in the drawing.

Figure 2:
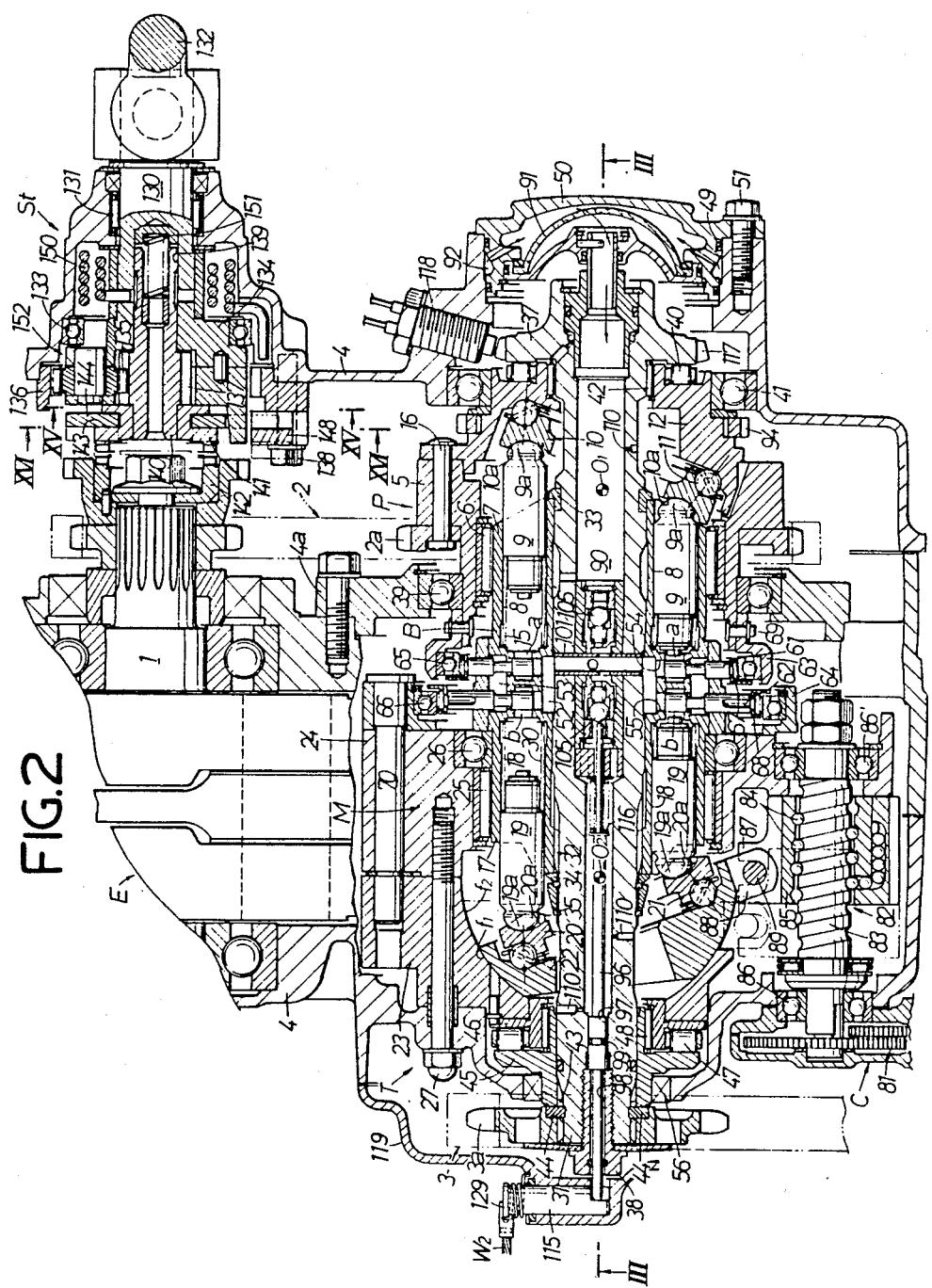
Figure 3:
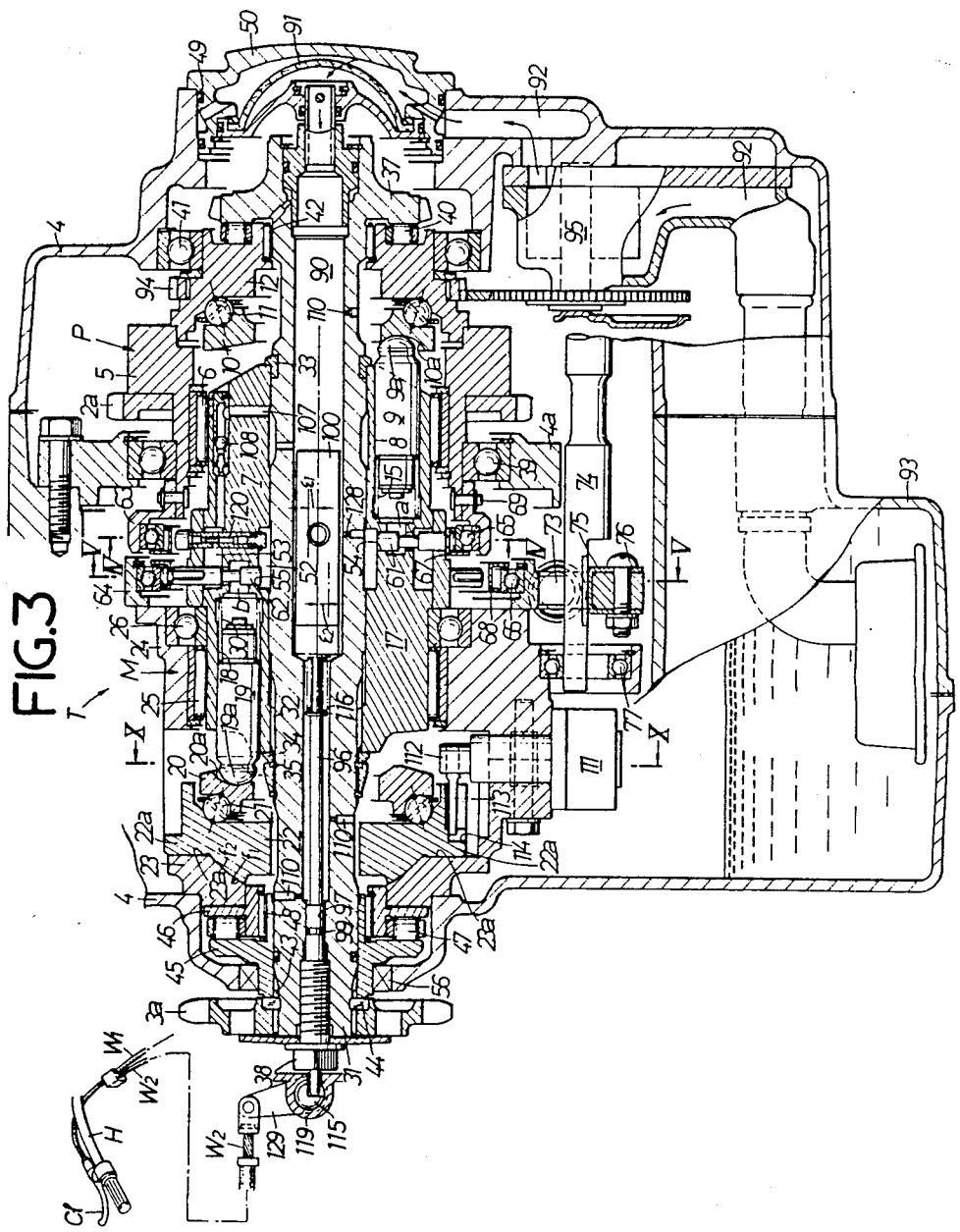

Referring to FIGS. 2 and 3, the transmission T is comprised of a swashplate type constant displacement hydraulic pump P and a swashplate type variable displacement hydraulic motor M. The hydraulic motor corresponds to a hydraulic device according to the present invention in this embodiment.

Specifically, the hydraulic pump P comprises the sleeve-shaped input shaft 5 having an output sprocket 2a of the primary reduction device 2 fixedly secured thereto by rivets 16, a pump cylinder 7 relatively rotatably fitted into the inner wall of the input shaft 5 with needle bearings 6 interposed therebetween, a plurality and odd-number of pump plungers 9 slidably inserted in a plurality of cylinder bores 8 annularly arranged to surround a rotational center of the pump casing 7, a pump swashplate 10 of which a fore surface thereof is adapted to abut against the outer end of each of the pump plungers 9 and a pump swashplate holder 12 for supporting a back surface of the pump swashplate 10 with the aid of an angular contact ball bearing 11 to hold the swashplate 10 in an attitude inclined about a phantom trunnion axis $0_1$ laid normal to an axis of the pump cylinder 7, by a predetermined angle with respect to the axis of the pump cylinder 7. The pump swashplate holder 12 is also fixedly secured to the input shaft 5 by means of the rivets 16. The angular contact ball bearing 11 is constructed in such a manner as to impart an aligning function to the pump swashplate 10 in cooperation with the pump swashplate holder 12.

Indeed, the pump swashplate 10 is adapted to repeat suction and discharge strokes by imparting reciprocal movement to the pump plungers 9 during rotation of the input shaft 5.

To improve followability of the pump plungers 9 with respect to the pump swashplate 10, a plurality of coil springs 15 are accommodated in the bores 8 so as to allow the pump plungers 9 to forcibly move in the axial direction thereof.

Figure 21:
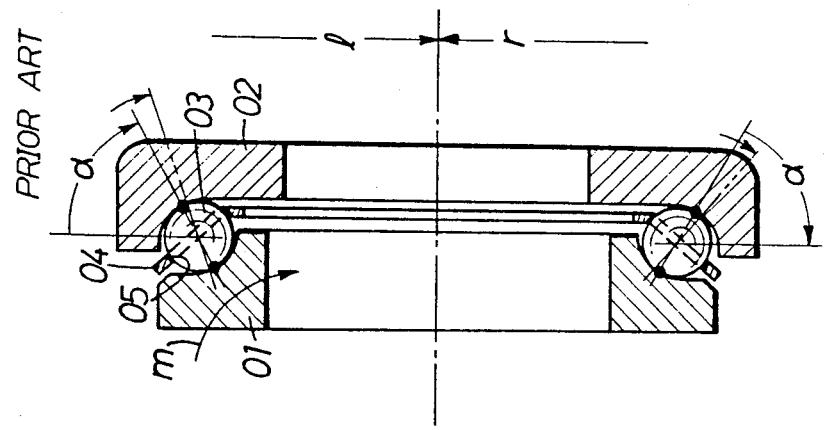
FIG. 21 is a vertical sectional view of a conventional angular contact ball bearing.
Figure 22:
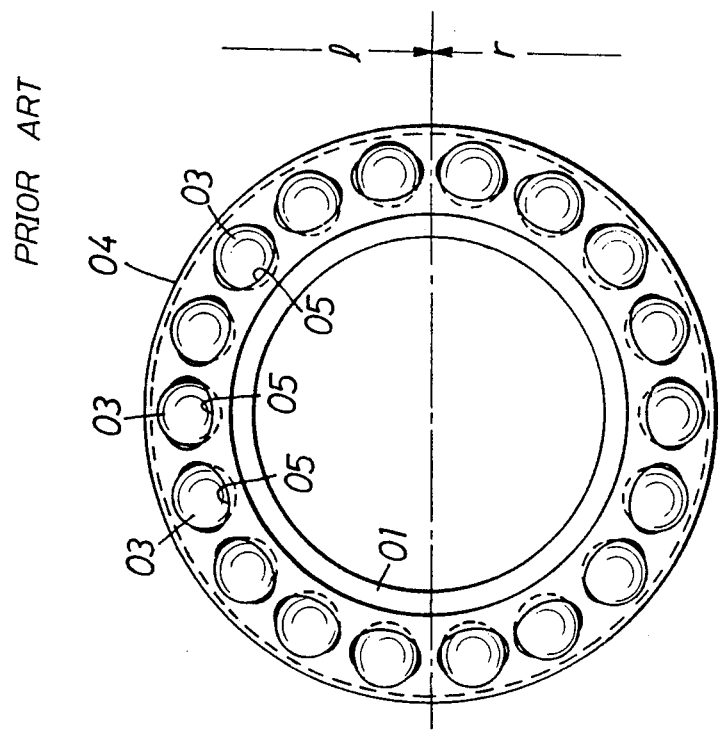
FIG. 22 is a plan view illustrating a relationship between a retainer and balls in FIG. 21.

It should be noted that the angular contact ball bearing 11 is designed in a different manner from a conventional one of the same kind as shown in FIGS. 21 and 22. As is apparent from the drawings, the conventional ball bearing includes a pair of oppositely located races 01 and 02 with a number of annularly arranged balls 03 interposed therebetween in such a manner that they are accommodated in a number of circular pockets 05 on an annular retainer 04 by a rate of one ball per one circular pocket to restrict a distance between the adjacent balls. When a magnitude of thrust load exerted on the ball bearing as constructed in the above-described manner is different on both sides, one of them being an upper half side identified by l and the other one being a lower half side identified by r as viewed in the drawings, an axial moment is produced between the races 01 and 02 whereby a contact angle α varies with respect to each of the balls 03, as shown in FIG. 21. Namely, as shown in FIG. 23, a contact angle α increases on a side where the balls receives a high magnitude of thrust load but it decreases on the opposite side. As a result, a track on which the balls roll has a decreased radius on the side where they receive a high magnitude of thrust load but it has an increased radius on the opposite side. Thus, when both the races 01 and 02 are relatively rotated by a certain angle, the balls 03 have an increased revolving angle on the side where they receive a high magnitude of thrust load but they have a decreased one on the opposite side on the assumption that they are not restricted by the retainer 04 at all.

With respect to the conventional ball bearing, however, it has been investigated by the inventors that since all the balls 03 are accommodated in the pockets 05 on the retainer 04 at a rate of one ball per one pocket, it follows that the retainer 4 restricts a range of the aforementioned revolving angle of balls with the result in that a malfunction that a high magnitude of frictional force appears between the retainer 04 and the balls 03 or various types of loads are imparted to the retainer from a group of balls, resulting in an elongated durability of the bearing failing to be assured.

To obviate the foregoing problem, it may occur to someone skilled in the art that the ball 03 accommodated in each of the pockets 05 on the retainer 04 should be provided with an increased play. If such a measure is taken, the number of pockets 05 formed on the retainer 04 having specified dimensions decreases naturally. Accordingly, the number of usable balls 03 decreases, resulting in a reduced capacity of a load to be borne by the bearing. Further, if the retainer 04 is removed in order to increase the number of usable balls 03 as much as possible, there is a danger that all the balls may violently collide with each other and thereby wear down within a short period of time.

Figure 19:
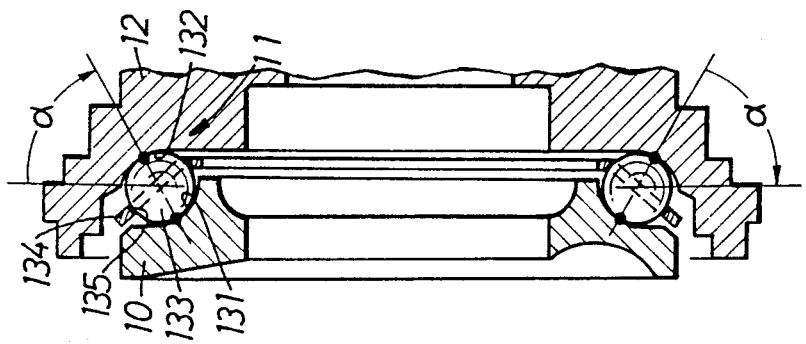
Figure 20:
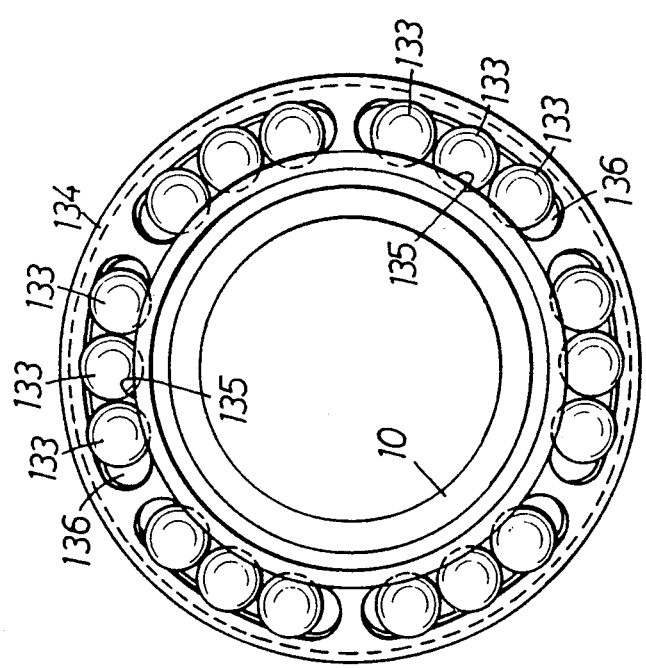

An angular contact ball bearing 11 in accordance with an embodiment of the present invention is constructed to obviate the foregoing drawback inherent to the aforementioned conventional bearing of the same kind. Specifically, as shown in FIGS. 19 and 20, the ball bearing 11 is comprised of races 131 and 132 integrally formed on the opposed surfaces of the swashplate 10 and the swashplate holder 12, a number of annularly arranged balls 133 (18 balls in the case of the illustrated embodiment) interposed between both the races 131 and 132 and an annular retainer 134 for holding the balls 133. The retainer 134 is formed with a plurality of circumferencially extending arcuate pockets 135 (6 pockets in the case of the illustrated embodiment) which are arranged annularly, and a plurality of balls 133 (3 balls in the case of the illustrated embodiment) are accommodated in each of the pockets 135. It should be noted that each of the pockets 135 has a certain amount of play 136 required for absorbing a difference in revolving angle between one half-side and the other half-side.

Refering to FIGS. 2 and 3 again, the hydraulic motor M includes a motor cylinder 17 disposed on the same axis of the pump cylinder 7 at a position located leftward from the latter as viewed in the drawings, a plurality and odd-number of motor plungers 19 slidably inserted in a plurality of cylinder bores 18 annularly arranged to surround a center of rotation of the motor cylinder 17, a motor swashplate 20 adapted to permit the fore end of the motor plungers 19 to come in contact therewith, a motor swashplate holder 22 for supporting a back surface of the motor swashplate 20 with the aid of an angular contact ball bearing 21, and a motor swashplate anchor 23 for supporting a back surface of the motor swashplate holder 22. The ball bearing 21 is constructed in the same manner as the ball bearing 11 disposed on the hydraulic pump P side.

Figure 14:
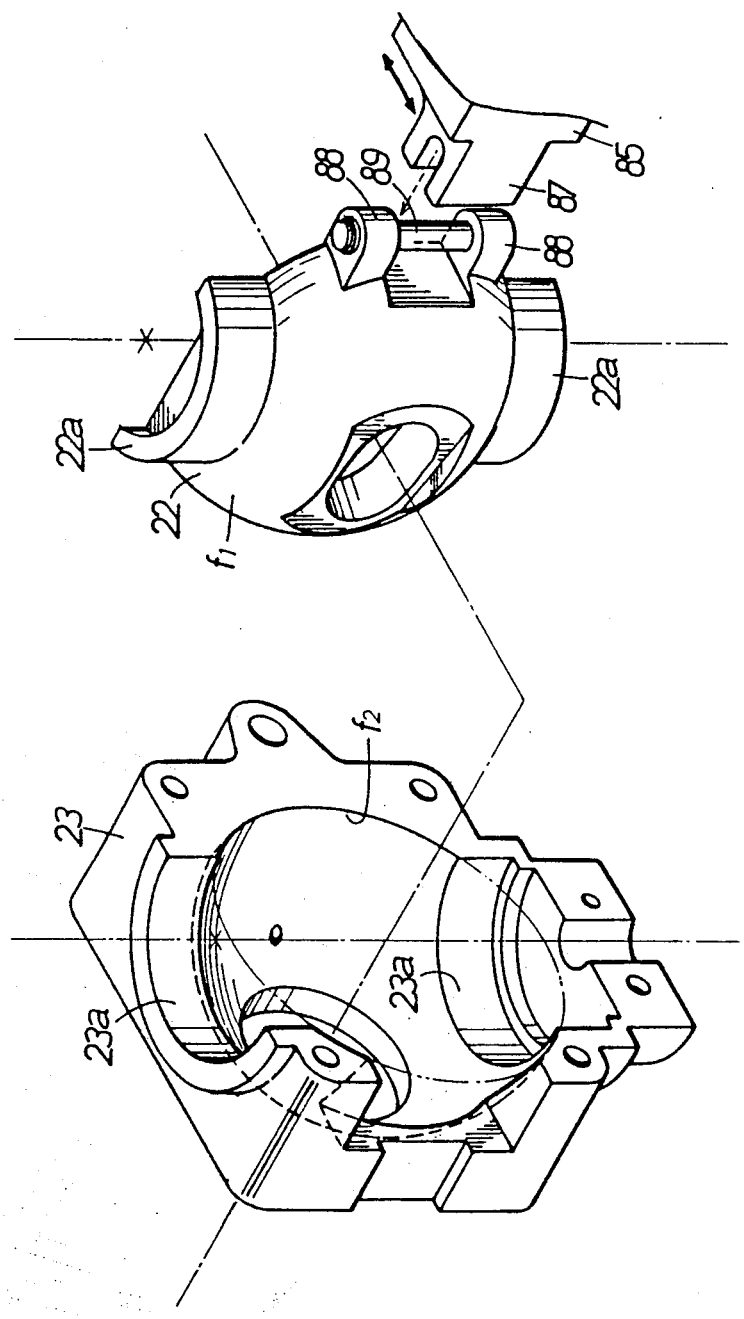

As shown in FIG. 14, oppositely located surfaces $f_1$ and $f_2$ on the motor swashplate holder 22 and the motor swashplate anchor 23 adapted to come in contact with one another are shaped in the form of a spherical surface of which center is located at a position where an axis of the motor cylinder 17 intersects a trunnion axis $O_2$.

The motor swashplate holder 22 is integrally formed at both of its ends with a pair of semicylindrical trunnion shafts 22a located on the trunnion axis $O_2$ which intersects the axis of rotation of the motor cylinder 17, and the semicylindrical shafts 22a are rotatably engaged with a pair of semicylindrical recesses 23a formed on both the ends of the motor swashplate anchor 23. Incidentally, the trunnion shafts 22a and the recesses 23a may have any shape other than the semicylindrical one, if it is assured that rotation of the motor swashplate holder 22 about an axis other than the trunnion axis $O_2$ is prevented when they are engaged to one another. For instance, they may have a semiconical shape.

The angular contact ball bearing 21 is constructed in such a manner as to impart an aligning function to the motor swashplate 20 in coorporation with the motor swashplate holder 22.

The motor swashplate anchor 23 is fixedly secured to the left-hand side wall of the casing 4 along with a cylindrical cylinder holder 24 connected to the right end of the motor swashplate anchor 23 by bolt 27. The cylinder holder 24 rotatably supports the outer peripheral surface of the motor cylinder 17 with a needle bearing 25 and a ball bearing 26 interposed in order therebetween.

The motor swashplate 20 is adapted to move by rotation of the motor swashplate holder 22 between an upright standing position where it intersects the axis of the motor cylinder 17 by an angle of 90 degrees and a maximum inclined position where it is inclined at a certain inclination angle with respect to the axis of the motor cylinder 17. In an inclined state, it can repeat expansion and contraction strokes by imparting reciprocal movement to the motor plungers 19 during rotation of the motor cylinder 17.

To improve followability of the plungers 19 with respect to the motor swashplate 20, coil springs 30 are received in the cylinder bores 18 so as to allow the plungers 19 to bias in the expanding direction thereof under the effect of resilient force of the coil springs 30.

The pump cylinder 7 and the motor cylinder 17 are integrally connected to one another so that a cylinder block B is constituted. An output shaft 31 is extended through a center portion of the cylinder block B. The cylinder block B is immovably mounted on the output shaft 31 in such a manner that the outer end of the pump cylinder 7 abuts against a split type stopper ring 33 locked on the outer surface of the output shaft 31, the motor cylinder 17 is spline-fitted at 32 to the output shaft 31 and a cir-clip 35 adapted to abut against the outer end of the motor cylinder 17 via a seat plate 34 is locked on the output shaft 31.

The right-hand end part of the output shaft 31 is extended also through the pump swashplate 10 and the pump swashplate holder 12, and a radial flange 37 having a high rigidity for supporting a back surface of the pump swashplate holder 12 via a thrust roller bearing 40 is made integral with the output shaft 31. In the illustrated embodiment, the flange 37 is integrated with the output shaft 31 by an integral forming process. Additionally, the output shaft 31 rotatably supports the pump swashplate holder 12 with a needle bearing 42 interposed therebetween.

The left-hand end part of the output shaft 31 is extended through the motor swashplate 20, the motor swashplate holder 22 and the motor swashplate anchor 23. A retainer 46 and a thrust roller bearing 47 are interposed successively as viewed from the motor swashplate anchor 23 side between the motor swashplate anchor 23 and a support sleeve 45 spline-connected at 43 to the outer peripheral surface of the output shaft 31 at the left-hand end part thereof and fixed thereto with the use of a split type cotter 44. In addition, the output shaft 31 is rotatably supported by the motor swashplate anchor 23 with a needle bearing 48 and the retainer 46 interposed in order therebetween.

Since all the components constituting the transmission T arranged between the output sprocket 2a and the cotter 44 are mounted on the output shaft 31 as a single assembly, mounting of the assembly to and dismounting of the same from the casing 4 of the transmission T can be achieved easily.

When the assembly is mounted in the casing 4 of the transmission T, the pump swashplate holder 12 is supported on the right-hand side wall of the casing 4 via a ball bearing 41 interposed therebetween, the input shaft 5 is supported in an intermediate support wall 4a removably secured to the casing 4 by bolting with a ball bearing 39 interposed therebetween, and the motor swashplate anchor 23 is fixedly secured to the left-hand side wall of the casing 4 by means of bolts 27. A cap 50 for closing a maintenance hole 49 opened at the right-hand side wall of the casing 4 is fixed thereto by means of bolts 51. On the other hand, an oil seal 56 kept in close contact with the outer peripheral surface of the support sleeve 45 is sealably fitted into the left-hand side wall of the casing 4. In addition, an input sprocket 3a for the secondary reduction device 3 is fixedly secured to the output shaft 31 using a single bolt 38 at a position located outwardly of the casing 4. It should be noted that the input sprocket 3a functions as means for preventing the cotter 44 from being disconnected from the output shaft 31 in such a manner that the outer peripheral part of the cotter 44 is retained by the input sprocket 3a.

For the purpose of assuring that the pump swashplate 10 is rotated in synchronization with the pump cylinder 7, it is formed with spherical recesses 10a with which spherical ends 9a of the pump plunger 9 are brought in engagement.

Additionally, for the purpose of assuring that the motor swashplate 20 is rotated in synchronization with the motor cylinder 17, it is likewise formed with spherical recesses 20a with which spherical ends 19a of the plungers 19 are brought in engagement.

Both the spherical recesses 10a and 20a are formed to have a radius larger than that of the corresponding spherical ends 9a and 19a so that their engaged state with respect to the spherical ends 9a and 19a is reliably maintained at any position.

Figure 11:
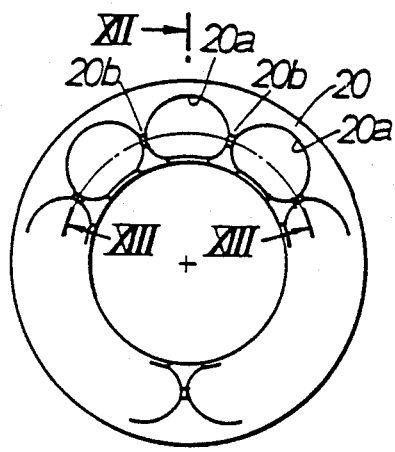
Figure 12:
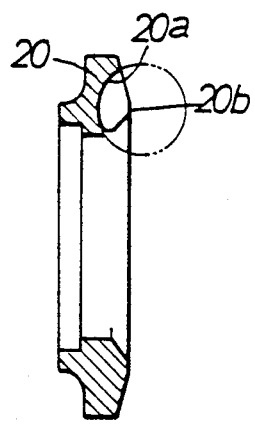
Figure 13:
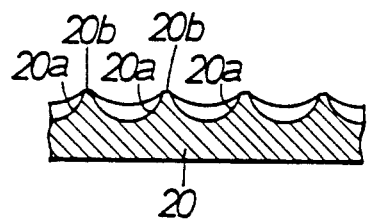

Further, particularly in the hydraulic motor M, partitions 20b between the adjacent spherical recesses 20a are formed in a mountain-shaped contour radially projecting toward the central part of the hydraulic motor M in order to assure that a torque is transmitted between the motor plungers 19 and the motor swashplate 20 without fail (see FIGS. 11 to 13). Incidentally, such construction may be employed for the hydraulic pump P side too.

Refering to FIGS. 2 to 5, the cylinder block B is formed with an annular inner oil passage 52 and an annular outer oil passage 53 arranged concentrically about the center axis of the output shaft 31 between a group of cylinder bores 8 of the pump cylinder 7 and a group of cylinder bores 18 of the motor cylinder 17, a plurality of first valve bores 54 and a plurality of second valve bores 55 extending through an annular partition between both the oil passages 52 and 53 and an outer peripheral wall located outwardly of the outer oil passage 53, both the first and second valve bores 54 and 55 having the same number as that of the cylinder bores 8 and 18, a plurality of pump ports a by way of which the cylinder bores 8 are communicated with the first valve bores 54, and a plurality of motor ports b by way of which the cylinder bores 18 are communicated with the second valve bores 55.

The inner oil passage 52 is provided in the form of an annular groove extending along the inner peripheral surface of the cylinder block B and its opened surface is closed with the outer peripheral surface of the output shaft 31.

Figure 7:
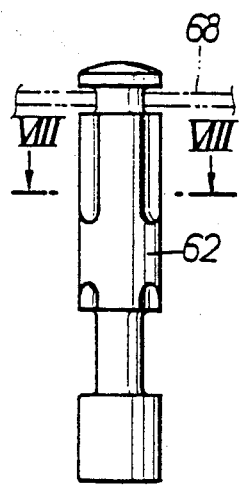
Figure 8:
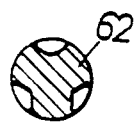

A plurality of first spool type distributing valves 61 are slidably inserted in the first valve bores 54, while a plurality of second spool type distributing valves 62 are likewise slidably inserted in the second distributing valves bores 55 (see FIGS. 7 and 8). A first eccentric ring 63 surrounding the first distributing valves 61 is engaged at their outer ends with a ball bearing 65, while a second eccentric ring 64 surrounding the second distributing valves 62 is likewise engaged at their outer ends with a ball bearing 66.

To assure a forcibly engaged state with respect to the first and second distributing valves 61 and 62, the outer ends of the first distributing valves 61 are connected to one after another using a first enforcing ring 67 disposed in a concentric relationship with respect to the first eccentric ring 63 and the outer ends of the second distributing valves 62 are likewise connected to one after another using a second enforcing ring 68 disposed in a concentric relationship with respect to the second eccentric ring 62.

Figure 4:
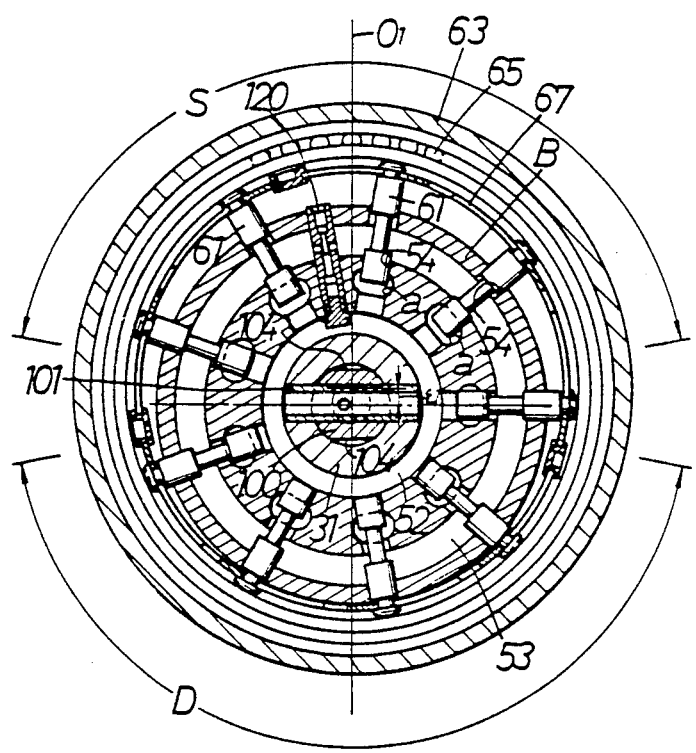

The first eccentric ring 63 is secured to the outer peripheral surface of the input shaft 5 by means of joint pins 69 so that the ring 63 is located at a position offset from the center of the output shaft 31 along the phantom trunnion axis $O_1$ by a distance of $\epsilon_1$, as shown in FIG. 4.

When relative rotation is made between the input shaft 5 and the pump cylinder 7, the first distributing valves 61 are caused to reciprocally move in the first valve bores 54 between an inner position and an outer position as viewed in the radial direction with a stroke as long as two times an eccentric amount $\epsilon_1$ with the aid of the first eccentric ring 63. As shown in FIG. 4, the first distribution valves 61 located in a delivery region D of the hydraulic pump P move on the inner position side so that the corresponding pump ports a are communicated with the outer oil passage 53 but communication with the inner oil passage 52 is interrupted. This permits a working oil to be discharged at a high pressure from the cylinder bores 8 to the outer oil passage 53 by means of the plungers 9 which are executing a delivery stroke. On the other hand, the first distributing valves 61 located in a suction region S move on the outer position side so that the corresponding pump bores a are communicated with the inner oil passage 52 but communication with the outer oil passage 53 is interrupted. This permits a working oil to be sucked into the cylinder bores 8 from the inner oil passage 52 by means of the plungers 9 which are executing a suction stroke.

Figure 5:
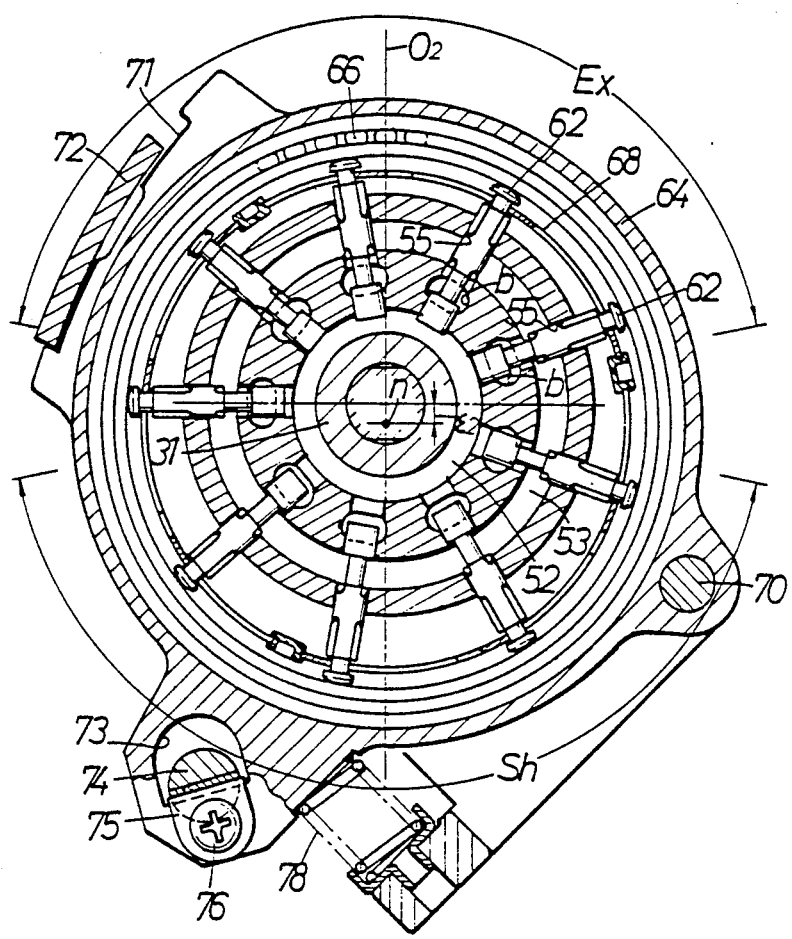
Figure 6:
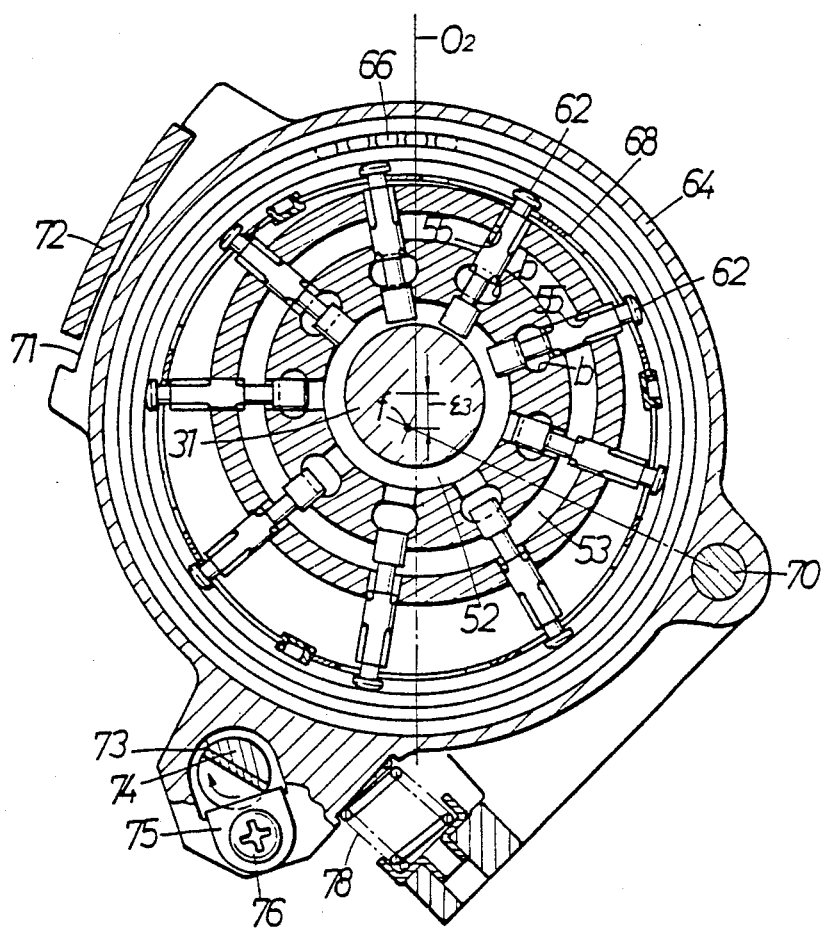

As shown in FIGS. 5 and 6, the second eccentric ring 64 is operatively connected to the cylinder holder 24 via a pivotal shaft 70 so as to swing between a clutch ON position n and a clutch OFF position f. When the second eccentric ring 64 is located at the clutch ON position b shown in FIG. 5, it assumes a position offset from the center of the output shaft 31 along the trunnion axis $O_2$ by a predetermined distance $\epsilon_2$. On the other hand, when it is located at the clutch OFF position f shown in FIG. 6, it assumes a position offset from the center of the output shaft 31 by a distance $\epsilon_3$ which is longer than the eccentric amount $\epsilon_2$. In order that a positional restriction is made in the above-mentioned manner, the second eccentric ring 64 is formed with a cutout 71 on the outer peripheral surface thereof and a stopper 72 adapted to abut against both the inside ends of the cutout 71 is made integral with the casing 4. Namely, the clutch ON position n of the second eccentric ring 64 is restrictively determined by allowing the stopper 72 to abut against one inside end of the cutout 71, while the clutch OFF position f of the same is restrictively determined by allowing the stopper 72 to abut against the other inside end of the cutout 71.

The second eccentric ring 64 is formed with a through hole 73 on one side thereof through which a cam shaft 74 extending in parallel with the output shaft 31 is inserted. A slipper plate 75 to be engaged with the cam shaft 74 is fixedly secured to the second eccentric ring 64 by means of a bolt 76 in such a manner as to cover one side face in the through hole 73.

As shown in FIG. 3, the cam shaft 74 is supported on the casing 4 with the aid of an opposing pair of ball bearings 77 and a lever (not shown) disposed on an outer end of the cam shaft 74 is operatively connected to a clutch lever Cl attached to a stering handle H for the motorcycle via an actuating wire $W_1$. When the cam shaft 74 is rotated by actuating the clutch lever Cl, the slipper plate 75 is biased by the cam shaft 74 so that the second eccentric ring 64 is swung to the clutch OFF position f.

In addition, as shown in FIG. 5, a clutch spring 78 adapted to resiliently bias the second eccentric ring 64 toward the clutch ON position n side is engaged with the second eccentric ring 64. Thus, when the cam shaft 74 is actuated so as to move backward away from the slipper plate 75, the second eccentric ring 64 is caused to swing to the clutch ON position n under the effect of resilient force of the clutch spring 78.

When the second eccentric ring 64 assumes the clutch ON position n (see FIG. 5), the second distributing valves 62 are reciprocally displaced in the second valve bores 55 by the second eccentric ring 64 between the inner position and the outer position as viewed in the radial direction of the motor cylinder 17 with a stroke as long as two times an eccentric amount $\epsilon_2$ as the motor cylinder 17 is rotated. The second distributing valves 62 located in an expansion region Ex of the hydraulic motor M are caused to move on the inner position side so that the corresponding motor ports b are communicated with the outer oil passage 53 but communication with the inner oil passage 52 is interrupted. Thus, a working oil is fed at a high pressure to the cylinder bores 18 of the motor plungers 19 which are executing an expansion stroke. On the other hand, the second distributing valves 62 located in a shrinkage region Sh are caused to move on the outer position side so that the corresponding motor ports b are communicated with the inner oil passage 52 but communication with the outer oil passage 53 is interrupted. Thus, a working oil is discharged to the inner oil passage 52 from the cylinder bores 18 of the motor plungers 19 which are executing a contraction stroke.

Additionally, when the second eccentric ring 64 assumes the clutch OFF position f (see FIG. 6), the second distributing valves 62 are reciprocally displaced in the second valve bores 55 by the second eccentric ring 64 between the inner position and the outer position as viewed in the radial direction of the motor cylinder 17 with a stroke as long as two times an eccentric amount $\epsilon_3$ as the motor cylinder 17 is rotated. While the second distributing valves 62 are located at the inner position as well as at the outer position, they permit the outer oil passage 53 to be opened to the outside of the cylinder block B.

With the above construction of the hydraulic motor, when the input shaft 5 of the hydraulic pump P is rotated by the primary reduction device 2 while the second eccentric ring 64 is kept at the clutch ON position n, discharge and suction strokes are alternately given to the pump plungers 9 by means of the pump swashplate 10.

While the pump plungers 9 move past the discharge region D, a working oil is fed at a high pressure to the outer oil passage 53 from the cylinder bores 8. On the other hand, while they move past the suction region S, a working oil is sucked in the cylinder bores 8 from the inner oil passage 52.

A highly pressurized working oil delivered to the outer oil passage 53 is fed to the cylinder bores 18 of the motor plungers 19 which are located in the expansion region Ex of the hydraulic motor M. On the other hand, a working oil is discharged to the inner oil passage 52 from the bores 18 by means of the motor plungers 19 which are located in the shrinkage region Sh.

At this moment, the cylinder block B is rotated under the influence of the sum of a reactive torque imparted by the pump cylinder 7 from the pump swashplate 10 via the pump plungers 9 which are executing a discharge stroke and a reactive torque imparted by the motor swashplate 20 via the motor plungers 19 which are executing an expansion stroke, and a rotational torque generated by the cylinder block B is transmitted to the secondary reduction device 3 via the output shaft 31.

In this case, a shift ratio of rotation of the input shaft 5 to rotation of the output shaft 31 is represented by the following equation $$\text{shift ratio} = 1 + \frac{\text{capacity of the hydraulic motor } M}{\text{capacity of the hydraulic pump } P}$$

Accordingly, when a capacity of the hydraulic motor M is changed from zero to a certain value, a shift ratio can be changed from 1 to a certain required value. It should be noted that since a capacity of the hydraulic motor M is determined by a stroke of the motor plungers 19, a shift ratio can be continuously adjusted from a level of 1 to a certain value by inclining the motor swashplate 20 from the upright standing position to a certain inclined position.

The angular contact ball bearing 11 receives a thrust load from a group of pump plungers 9 during operation of the hydraulic pump P and a magnitude of the so received thrust load is remarkably higher in the delivery region F than that in the suction region D. Thus, a contact angle $\alpha$ of the balls 133 increases on the discharge region D but decreases in the suction region S, causing a difference in revolving angle of the balls 133 to be developed between both the regions S and D as the pump swashplate 10 and the motor swashplate holder 12 are rotated relatively. However, any difference in revolving angle is absorbed in a play 136 in each of the pockets 135 in the above-mentioned manner.

Accordingly, a set of balls 133 accommodated in a pockets 135 can freely roll without any hindrance being caused by the retainer 134 and other sets of balls.

At this moment, the balls 133 accommodated in the respective pocket 136 tend to collide with each other. However, since the number of balls 135 accommodated in a single pocket 135 is very small, an intensity of impact force is comparatively small and thereby the balls 133 do not wear within a short period of time.

Additionally, since the number of pockets 135 is smaller than that of balls 133, the number of usable balls 133 is only bearly restricted by a certain amount of play 136 which is suitably determined for each of the pockets 135. Accordingly, the number of balls 133 is not substantially different from that determined for a conventional ball bearing of the same kind whereby a sufficient load capacity can be assured.

On the other hand, with respect to the angular contact ball bearing 21 for the hydraulic motor M, a magnitude of thrust load received from a group of plungers 19 is higher on the expansion region Ex side than on the shrinkage region Sh side. However, the ball bearing 21 can smoothly function in the same manner as the aforementioned ball bearing 11.

During operation of the transmission T, the pump swashplate 10 receives a thrust load developed by a group of pump plungers 9 and the motor swashplate 20 in turn receives a thrust load developed by a group of motor plungers 19 in the opposite direction. A thrust load received by the pump swashplate 10 is borne by the output shaft 31 via the angular contact ball bearing 11, the pump swashplate holder 12, the thrust roller bearing 40 and the flange 37, while a thrust load received by the motor swashplate 20 is likewise borne by the output shaft 31 via the angular contact ball bearing 21, the motor swashplate holder 22, the motor swashplate anchor 23, the thrust roller bearing 47, the support sleeve 45 and the cotter 44. Accordingly, the aforesaid thrust loads generate merely a tensile stress in the output shaft 31 but they have no effect on the casing 4 by which the output shaft 31 is supported.

In this case, a fore surface of the motor swashplate holder 22 carries the motor swashplate 20 via the thrust roller bearing 21 and a back surface of the same is carried by the motor swashplate anchor 23. Thus, no deflection occurs even when the motor swashplate holder 22 receives a thrust load generated by a group of motor plungers 19 via the motor swashplate 20. Indeed, since a spherical surface $f_1$ of the motor swashplate holder 22 of which the center is located at an intersection where the axis of the motor casing 17 intersects the trunnion axis $O_2$ is located opposite to a spherical surface $f_2$ of the motor swashplate anchor 23 of which the center is located at the same intersection where the axis of the axis of the motor casing 17 intersects the trunnion axis $O_2$, the motor swashplate holder 22 exhibits an aligning function under the effect of the mutual action between both of the spherical surfaces. Consequently, the motor swashplate holder 22 can smoothly turn about the trunnion axis $O_2$ and thereby an inclination angle of the motor swashplate 20 can be easily adjusted as required. At this moment, owing to engagement of the trunnion shafts 22a on the motor swashplate holder 22 with the recesses 23a on the motor swashplate anchor 23, rotation of the motor swashplate holder 22 about an axis other than the trunnion axis $O_2$ is inhibitively prevented. In addition, since the motor swashplate anchor 23 with a concave spherical surface $f_2$ formed thereon has a thickness which increases toward the periphery from the central part and thereby exhibits a high rigidity, it can satisfactorily stand against a high magnitude of load from the motor swashplate holder 22 and the thrust roller bearing 47.

Since the partitions 20b between the adjacent spherical recesses 20a on the motor swashplate 20 are formed in a mountain-shaped contour, a depth of effective engagement of the spherical recesses 20a on the motor swashplate 20 with the spherical ends 19a of the motor plungers 19 can be set to a sufficient extent without a need of designing the whole motor swashplate 20 to have a heavy thickness whereby the motor swashplate 20 can be reliably rotated without an occurrence of slippage of the plungers 19 from the spherical recesses 20a even during operation under a high magnitude of load, Accordingly, it becomes possible to design the motor swashplate 20 with light weight by forming the partitions 20b in the mountain-shaped contour as mentioned above.

In addition, since the pump swashplate 10 for the hydraulic pump P and the motor swashplate 20 for the hydraulic pump M receiving an aligning function in both the forward and backward directions under the effect of the spherical ends 9a and 19a of the plungers 9 and 19 and the angular contact ball bearings 11 and 21, they can be rotated in correct synchronization with the cylinder block B while maintaining their given position irrespective of how they are inclined.

When the second eccentric ring 64 is swung to the clutch OFF position f at a time of stoppage of the motorcycle of the like, the outer oil passage 53 which is kept at a high pressure is opened to the outside of the cylinder block B by way of the second distributing valves 62 and thereby a working oil having a high pressure fails to be fed to the hydraulic motor M, resulting in a interruption of a transmission of power from the hydraulic pump P to the hydraulic motor M. Namely, a so-called clutch OFF state is assumed.

Figure 10:
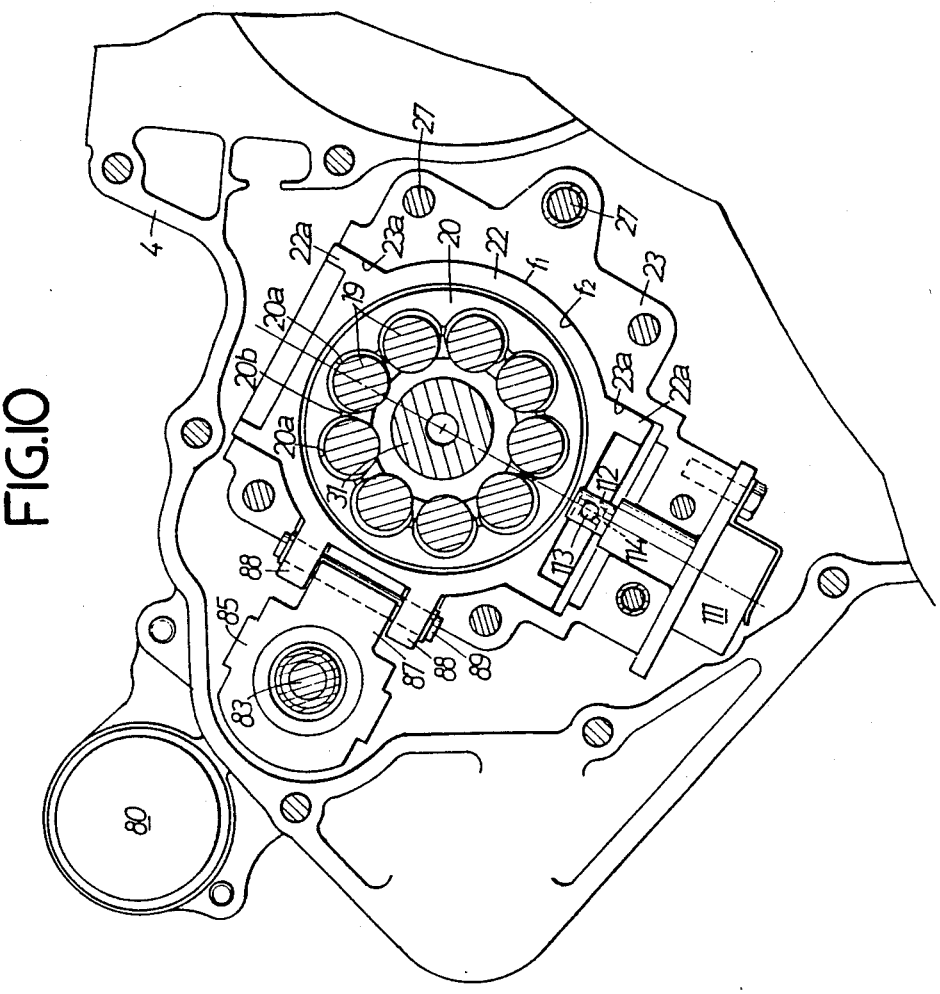

Referring to FIGS. 1, 2 and 10, the trunnion shafts 22a are operatively connected to a shift adjusting device C for adjusting an inclination angle of the motor swashplate 20.

The shift adjusting device C includes an electric motor 80 such as a pulse motor, a DC motor or the like of which the direction of rotation is reversible, a reduction gear assembly 81 operatively connected to the electric motor 80 and a ball-nut mechanism 82 operatively connected to the reduction gear assembly 81. The ball-nut mechanism 82 comprises a screw shaft 83 and a nut 85 threadably engaged with the screw nut 83 via a number of circulating balls 84. The screw shaft 83 is connected to an output gear in the reduction gear assembly 81 and both ends of the screw shaft 83 are rotatably supported by the casing 4 with the aid of ball bearings 86 and 86′. The nut 85 is formed with a connection arm 87 on one side thereof, and the connection arm 87 and a pair of connection arms 88 projecting from one side of the motor swashplate holder 22 to clamp the arm 87 therebetween are connected to one another via a joint pin 89 extending in parallel with the trunnion axis $O_2$. By making a connection in this way, rotation of the nut 85 about the screw shaft 83 is prevented.

As the screw shaft 83 is rotated in a normal direction by allowing the electric motor 80 to rotate in a normal direction, the nut 85 is caused to move in a leftward direction as viewed in the drawings and the motor swashplate 22 is then turned about the trunnion axis $O_2$ via the connection arms 87 and 88 whereby the motor swashplate 20 can stand upright. On the contrary, if the electric motor 80 rotates in a reverse direction, the nut 85 is caused to move in a rightward direction and thereby the motor swashplate 20 can be inclined.

Refering to FIGS. 3 and 10, a rotary type potentiometer 111 for detecting an inclination angle of the motor swashplate 20 to transmit control signals to various kinds of control devices is attached to the casing 4. The potentiometer 111 is provided with a lever 113 at the foremost end of a rotational shaft 112 and the lever 113 is fitted in an engagement groove 114 formed on one of the trunnion shafts 22a of the motor swashplate holder 22. Accordingly, if the motor swashplate holder 22 is turned to incline the motor swashplate 20, the rotational shaft 22 is correspondingly rotated in response to turning movement of the motor swashplate holder 22 via the lever 113 so that control signals are outputted from the potentiometer 111 corresponding to the existent inclination angle of the motor swashplate 20.

Figure 9:
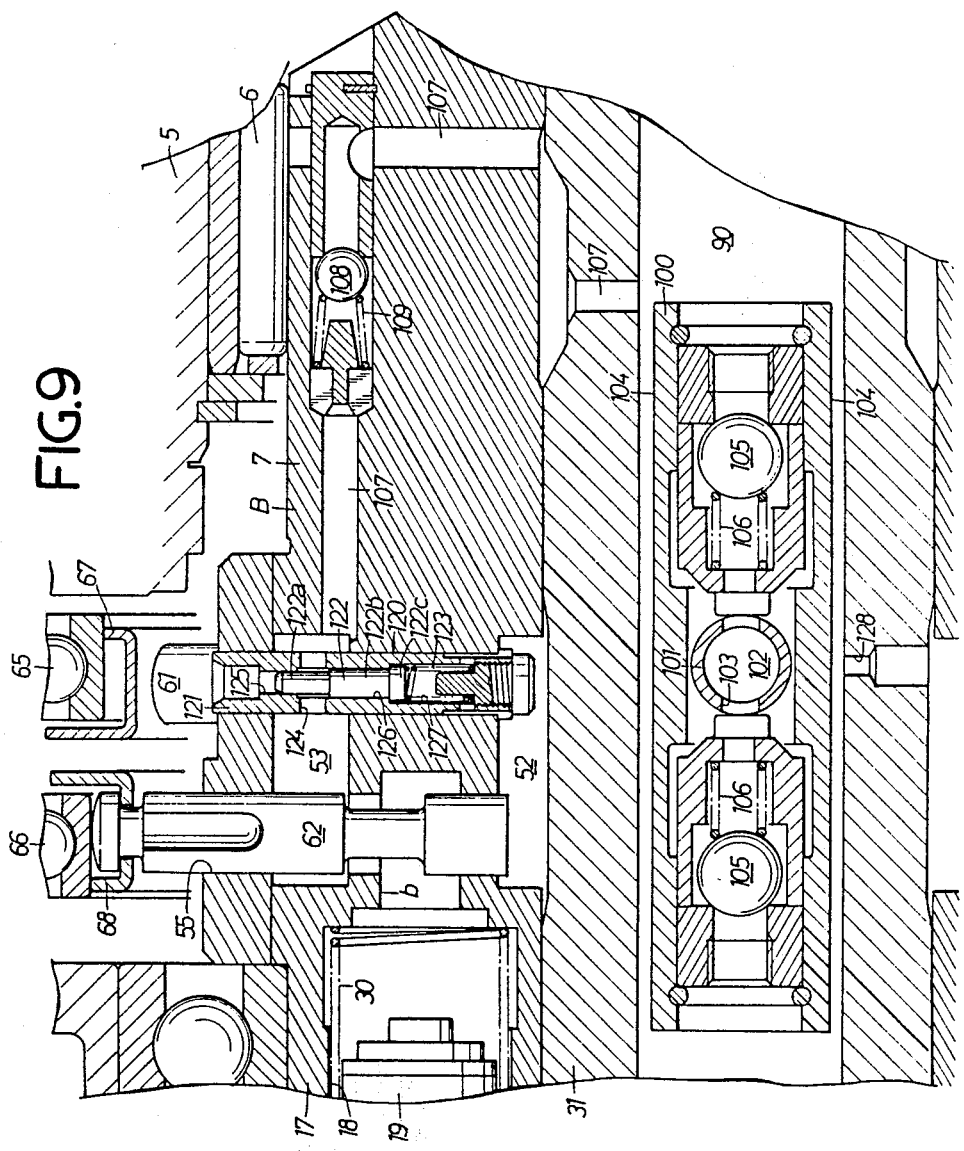

Refering to FIGS. 2, 3 and 9, the output shaft 31 is formed at its center portion with a central oil passage 90. The left-hand end of the output shaft 31 is closed with a push rod 96 which will be described later, while the right-hand end of the same is opened. An oil filter 91 located opposite to the inlet port is attached to the cap 50.

The inlet port of the central oil passage 90 is communicated with an oil reservoir 93 disposed on the bottom of the casing 4 via oil passages 92, and a supplement pump 95 adapted to be driven by a gear 94 fixedly mounted on the pump swashplate holder 12 is disposed midway of the oil passages 92. Accordingly, an oil in the oil reservoir 93 is continuously fed to the central oil passage 90 at all times by means of the supplement pump 95 during rotation of the engine E.

A valve sleeve 100 of which both ends are kept opened is fitted into the middle part of the central oil passage 90 and is fixed to the output shaft 31 by allowing a fixing pint 101 press fitted in a diametrical direction of the output shaft 31 to be penetrated through the latter. The fixing pin 101 has a hollow portion 102 of which both ends are opened to the inner oil passage 52 and a plurality of communication holes 103 through which the hollow portion 102 is communicated with the interior of the valve sleeve 100. Accordingly, it follows that the central oil passage 90 is communicated with the inner oil passage 52 via the valve sleeve 100 and the fixing pin 101.

A plurality of chamfered parts 104 through which the upstream side of the central oil passage 90 is communicated with the downstream side of the same are formed on the outer peripheral surface of the valve sleeve 100.

In addition, an opposing pair of check valves 105 and 105' with the fixing pin 101 located therebetween are provided symmetrically with respect to the fixing pin 101 in the interior of the valve sleeve 100 to prevent an oil from flowing back from the inner oil passage 52 to the central oil passage 90. The check valves 105 and 105' are normally biased in a closing direction under the effect of resilient force of valve springs 106 and 106'.

Additionally, a series of oil supply passages 107 by way of which the central oil passage 90 located upstream of the valve sleeve 100 is communicated with the outer oil passage 53 are provided in the output shaft 31 and the cylinder block B, and a second check valve 108 serving to prevent an oil from flowing back from the outer oil passage 53 to the central oil passage 90 is disposed midway of the oil supply passages 107. The second check valve 108 is normally biased in a closing direction under the effect of resilient force of a valve spring 109.

Further, a radially extending orifice 110 is perforated in position in the output shaft 31 for the purpose of supplying lubricating oil to various parts in the transmission T.

When a pressure in the inner oil passage 52 on the lower pressure side is reduced lower than a pressure in the central oil passage 90 due to leakage of an oil from the closed hydraulic circuit extending between the hydraulic pump P and the hydraulic motor M during normal load operation for hydraulically driving hydraulic motor M by the hydraulic pump P, the first check valves 105 and 105' are opened so that a working oil is supplemented from the central oil passage 90 to the inner oil passage 52. On the other hand, at this moment, the second check valve 108 prevents a working oil in the outer passage 53 on the higher pressure side from flowing into the central oil passage 90.

During reverse load operation, that is, engine-brake operation, the hydraulic motor M operates to provide a pumping effect, and the hydraulic pump P operates to provide a motor effect. Therefore, a pressure in the outer oil passage 53 is changed to a lower level and a pressure in the inner oil passage 53 is changed to a higher level. Thus, if a pressure in the outer oil passage 53 is reduced lower than a pressure in the central oil passage 90 due to leakage of an oil, it follows that the second check valve 108 is opened so as to allow a working oil to be supplemented from the central oil passage 90 to the outer oil passage 53 but the first check valves 105 and 105' block a reverse flow of the working oil from the inner oil passage 52 in the central oil passage 90.

In spite of the fact that an oil in the central oil passage 90 is supplied to various parts in the transmission T through the orifice 110, there is no fear that a pressure in the central oil passage 90 is excessively reduced by supplying an oil in this way. Thus, supplementing of a working oil from the central oil passage 90 to both the inner oil passage 52 and the outer oil passage 53 is not hindered at any rate.

The output shaft 31 is formed with a guide hole 97 at its left-hand end which is communicated with the central oil passage 90 and the bolt 38 in turn is formed with a through hole 98 at its central part which is communicated with the guide hole 97, so that a push rod 96 disposed on the central oil passage 90 so as to pass through the through hole 98 is slidably supported with the aid of a seal member 99. The inner end of the push rod 96 is located opposite to the left-hand first check valve 105 to forcibly open the latter, while the outer end of the same is disposed so as to face to a cam shaft 115. A return spring 116 is extended over a part of the push rod 96 so as to allow the latter to be normally biased in such a direction that it is brought in engagement with the cam shaft 115.

The cam shaft 115 is rotatably supported on a side cover 119 secured to the casing 4 while covering the side surface of the sprocket 3a, and a lever 129 fixed to the cam shaft 115 is connected to the clutch lever Cl via an actuating wire $W_2$.

When the clutch lever Cl is operated the push rod 96 is pushed via the cam shaft 115 to forcibly open the first check valve 105 and as a result, the inner oil passage 52 is opened to the central oil passage 90. When such operation is executed during engine-brake operation, the hydraulic motor M operates to provide a pump effect during the engine-brake operation as mentioned above whereby the inner oil passage 52 has an increased hydraulic pressure. This permits a working oil having a high pressure to immediately flow out via the opened first check valve 105 into the central oil passage 90 kept at a low pressure. Then, it flows back to the oil reservoir 93 through the respective parts to be lubricated whereby transmission of a hydraulic pressure from the hydraulic motor M to the hydraulic pump P is interrupted completely. Therefore, the hydraulic motor M is kept in an idling state and thereby an engine brake is released. This makes it possible to allow a vehicle to move under the influence of inertia.

In addition, if the clutch lever Cl is operated in a case where there is a need of displacing the vehicle by manual operation, although the hydraulic motor M is driven from the rear wheel side, the hydraulic motor M can assume an idling state under the same effect as previously mentioned so that the vehicle can be smoothly displaced by manual operation.

Referring to FIG. 9, the cylinder block B is provided with a pressure regulating valve 120 for the purpose of preventing an excessive increase of hydraulic pressure in the outer oil passage 53.

This pressure regulating valve 120 comprises a valve sleeve 121, a valve member 122 and a valve spring 123.

The valve sleeve 120 is press fitted to penetrate a partition between the inner oil passage 52 and the outer oil passage 53 as well as a peripheral wall located outwardly of the outer oil passage 53, in the radial direction. The valve sleeve 121 includes lateral holes 124 opened to the outer oil passage 53, a vertical valve bore 125 by way of which communication between the lateral holes 124 and the outer oil passage 53 is established, a guide bore 126 having a diameter appreciably larger than that of the valve bore 125 and extending from the lateral holes 124 in the opposite direction to the valve bore 125, and a spring chamber 127 having a larger diameter and extending in continuation from the guide bore 126.

The valve member 122 is exposed to the lateral holes 124 and includes a valve portion 122a adapted to come in slidable contact with the valve bore 125, a valve stem portion 122b adapted to come in slidable contact with the guide bore 126 and a flange-shaped stopper portion 122c adapted to abut against a stepped portion defined between the guide bore 126 and the spring chamber 127. The stopper portion 122c is normally held at a position where it abuts against the stepped portion under the effect of resilient force of a valve spring 123 received in the spring chamber 127. The spring chamber 127 is communicated with the inner oil passage 52 so as not to hinder movement of the valve member 122.

A hydraulic pressure in the outer oil passage 53 is exerted on an area of the stepped portion defined between the valve portion 122a and the valve stem portion 122b so that a valve opening force is imparted to the valve member 122. As long as a normal operative state is maintained with a hydraulic pressure in the outer oil passage 53 having a value less than a specified value, the valve member 122 is held in a closed state, that is, in such a state that the valve bore 125 is closed, because an intensity of resilient force of the valve spring 123 for biasing the valve member 122 in a closing direction is higher than an intensity of the aforementioned valve opening force. When a hydraulic pressure in the outer oil passage 53 has a value more than the specified value, the valve opening force is in excess of the resilient force of the valve spring 123 and thereby the valve member 122 slidably moves while compressing the valve spring 123 until the valve bore 125 is opened. This permits an excessively high hydraulic pressure in the outer oil passage 53 to be released to the outside of the cylinder block B via the valve bore 125. Thereafter, when a hydraulic pressure in the outer oil passage 53 resumes the specified value, the valve member 122 comes back to the valve closed state again under the effect of the resilient force of the valve spring 123. Therefore, this makes it possible to suppress an excessive increase of hydraulic pressure in the outer oil passage 53 even at a time of quick advancement of the vehicle or at a time of movement of the vehicle at a quickly accelerated speed. Thus, there is no need for designing the wall portion of the cylinder block B constituting the outer oil passage 53 to have a heavy thickness sufficient to stand against an excessively high pressure in the outer oil passage 53. This leads to a contribution to a design of a cylinder block B with light weight.

For the purpose of preventing an excessive increase of hydraulic pressure in the inner oil passage 52, the cylinder block B is formed further with a throttle hole 128 through which the inner oil passage 52 is communicated with the central oil passage 90. Therefore, any excessive increase of hydraulic pressure in the inner oil passage 52 can be suppressed even at a time when quick engine braking occurs.

Referring to FIG. 2 again, the flange 37 made integral with the output shaft 31 is formed with a number of teeth 117 around the outer periphery thereof so as to act also as a signal rotor, and a pickup coil 118 is threadably fitted to the casing 4 at a position located opposite to the outer periphery of the flange 37. The pickup coil 118 generates a series of pulses in response to rotation of the output shaft 31 and the so generated pulses are converted into electric current or voltage so that they are displayed on a speed meter (not shown) as a speed of movement of the vehicle.

Figure 15:
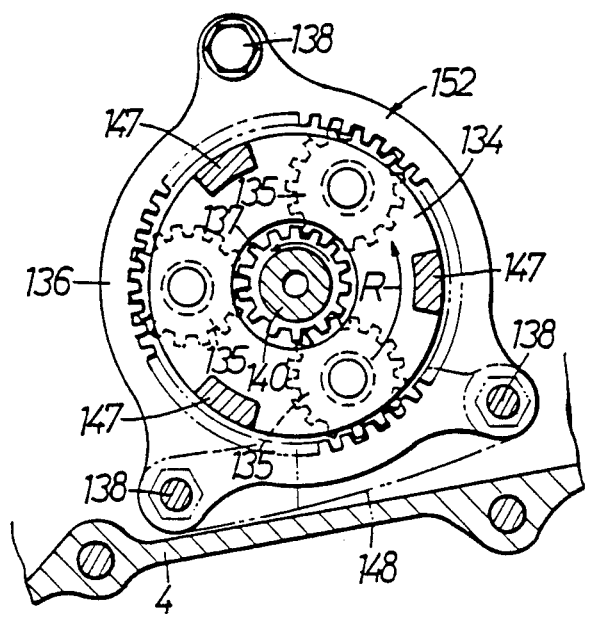
Figure 16:
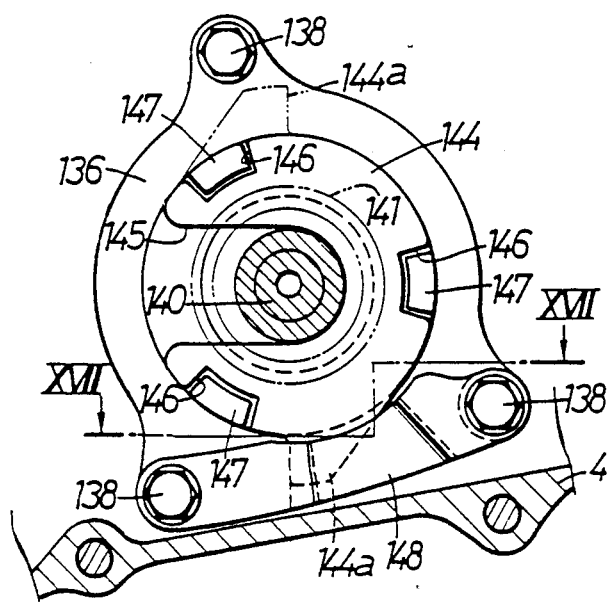
Figure 18:
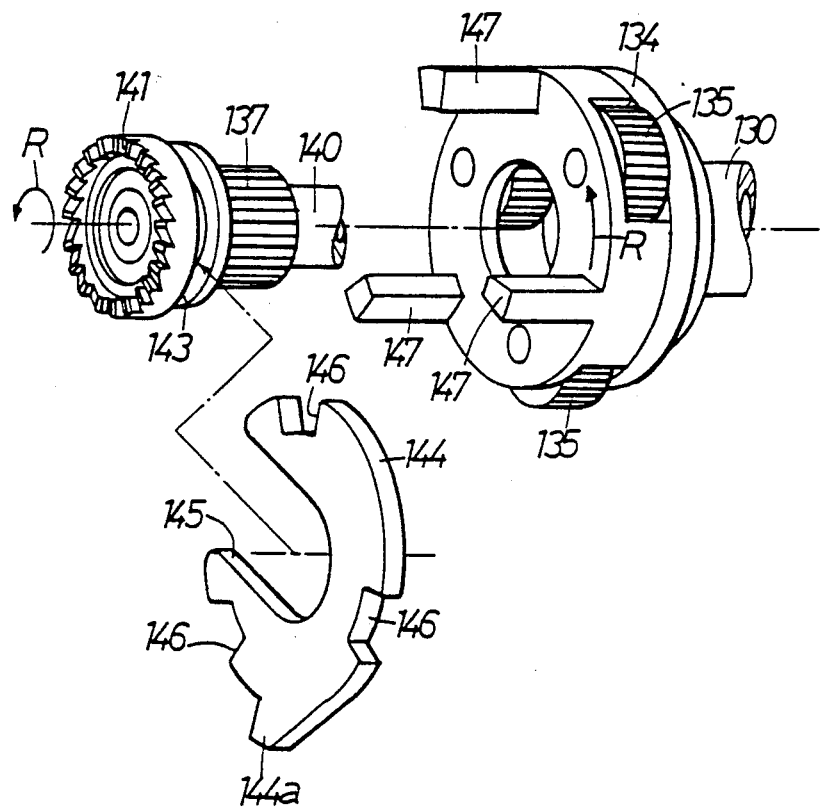
Figure 17:
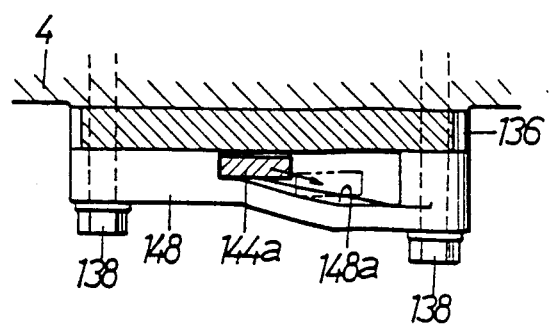

Referring to FIGS. 2, 15 and 18, the starter St includes a kick shaft 130 which is rotatably supported on the casing 4 with the aid of a needle bearing 131 in a coaxial relationship with respect to the crankshaft 1 of the engine E. The kick shaft 130 has a kick pedal 132 operatively connected to the outer end thereof.

A carrier 134 is made integral with the inner end part of the kick shaft 130 with a ball bearing 133 mounted on the outer periphery thereof, and three planetary gears 135 rotatably supported on the carrier 134 mesh with a ring gear 136 surround them and a sun gear 137 surrounded by them. The ring gear 136 is fixedly secured to the casing 4 by means of bolts 138 and the sun gear 137 is made integral with a starter shaft 140 which is slidably fitted into a guide hole 139 formed at the central part of the kick shaft 130. Accordingly, the sun gear 137 is axially slidable relative to the planetary gears 135.

The sun gear 137 is fixedly provided with a driving ratchet 141 at its fore end which is engageable to and disengageable from a driven ratchet 142 which is fixedly secured to the right-hand end of the crankshaft 1. The driving ratchet 141 has an annular groove 143 formed on the outer peripheral surface thereof to which a control plate 144 is relatively rotatably engageable. Such engagement is achieved via a large cutout 145 which extends from the outer peripheral surface to the central part of the control plate 144. In addition, three small cutouts 146 are formed on the outer peripheral surface of the control plate 144 in an equally spaced relationship, and three foot pieces 147 are axially slidably engaged with the small cutouts 146.

Additionally, the control plate 144 is provided with an arm portion 144a projecting outwardly radially therefrom which is engageable to and disengageable from a cam face 148a of a cam plate 148. The cam plate 148 is fixed to the inner wall of the casing 4 by means of the bolts 138, and the cam face 148a is designed in the form of an inclined face which permits the control plate 144 to axially move toward the crankshaft 1 side with respect to the control plate 144 as the latter is rotated in a cranking direction R of the crankshaft 1.

A return spring 150 for rotatably biasing the kick shaft 130 in an opposite direction to the cranking direction R is connected to the kick shaft 130. Additionally, a thrust spring 151 for biasing the starter shaft 140 toward the crankshaft 1 side is provided between the kick shaft 130 and the starter shaft 140 in a compressed state.

When the kick shaft 130 is rotated against resilient force of the return spring 150 in the cranking direction R by operating the kick pedal 132, the planetary gears 136 revolve both around the sun gear 136 and on its axis as carrier 134 is rotated whereby the sun gear 137 is rotationally driven at an increased speed in the cranking direction R. Thus, both the starter shaft 140 and the driving ratchet 141 are likewise driven.

On the other hand, the control plate 144 is rotated along with the carrier 134 in the cranking direction R so as to allow the arm portion 144a to be disengaged from the cam face 148a of the cam plate 148, the starter shaft 140 is caused to advance toward the crankshaft shaft 1 side under the effect of resilient force of the thrust spring 151 until the driving ratchet 141 is brought in meshing engagement with the driven ratchet 142. Accordingly, rotational force of the starter shaft 140 is transmitted to the crankshaft 1 via both the ratchets 141 and 142 and thereby the crankshaft 1 is cranked. Now, the engine E is ready to start its operation.

Once the engine E starts its rotation, the driven ratchet 142 strikes the driving ratchet 141 out of engagement in the axial direction, resulting in rotation of the crankshaft 1 failing to be transmitted to the starter shaft 140 side. Thereafter, when the kick pedal 132 is released from the operative state, the kick shaft 130, the carrier 134 and the control plate 144 are rotated in an anti-cranking direction under the effect of resilient force of the return spring 150. Then, when the arm portion 144a of the control plate 144 is engaged with the cam face 148a, the control plate 144 is retracted by the guiding function of the cam face 148a and at the same time, the driving ratchet 141 and the starter shaft 140 are also retracted against resilient force of the thrust spring 151 whereby the driving ratchet 141 can be completely disengaged from the driven ratchet 142.

In this manner, the crankshaft 1 can be driven at an increased speed by means of the kick shaft 130 coaxially arranged with respect to the crankshaft 1 by employing a planetary gear mechanism 152 comprising the planetary gears 135, the sun gear 137 and the ring gear 136. Indeed, since the starter St is operatively associated with the crankshaft 1 in a region located upstream of the primary reduction device 2 in the power transmission passage, the starter St can be mounted in a compact structure on one side of the engine E without any occurrence of interference with the hydrostatic continuously variable transmission T.

Incidentally, in the above-described embodiment, the present invention has been described with respect to a case where the swashplate type hydraulic device is employed for a hydraulic motor. However, the present invention should not be limited only to this. Alternatively, it may be employed for a hydraulic pump.

What is claimed is:

1. A swashplate type variable displacement hydraulic device comprising a transmission shaft, a cylinder disposed around the shaft and having a plurality of cylinder bores annularly arranged to extend in parallel with and surround an axis of rotation of the cylinder, a plurality of plungers slidably received in said cylinder bores, a swashplate having a fore surface against which surface outer ends of said plungers abut, a swashplate holder adapted to support a back surface of said swashplate via a first bearing means, said swashplate holder being disposed to be turnable about a trunnion axis which intersects the axis of rotation of the cylinder at right angles, a stationary swashplate anchor for supporting said swashplate holder, and support member means retained to said transmission shaft for supporting said swashplate anchor via a second bearing means, wherein said swashplate holder and said swashplate anchor have surfaces opposed to each other, said opposed surfaces being formed as spherical surfaces of which a center is located at a position where the axis of rotation intersects said trunnion axis, said swashplate anchor having a thickness which increases toward the outer periphery from the central part thereof, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein a thrust load given from the plungers to the swashplate is borne by the transmission shaft via said first bearing means, said swashplate holder, said swashplate anchor, said second bearing means and said support member means.

2. A swashplate type variable displacement hydraulic device of claim 1, wherein said device is applied to at least one of a hydraulic pump and a hydraulic motor which together constitute a hydrostatic continuously variable transmission usable for a vehicle, said hydraulic pump leading to an engine, said hydraulic motor leading to a wheel, said hydraulic pump and said hydraulic motor being connected with each other via a closed hydraulic circuit.

3. A swashplate type variable displacement hydraulic device of claim 2, wherein said device is applied to said hydraulic motor.

4. A swashplate type variable displacement hydraulic device of claim 2, wherein said closed hydraulic circuit includes a hydraulic passage by way of which a suction side of said hydraulic pump is hydraulically connected to a discharge side of said hydraulic motor, and said hydraulic passage is communicated with an oil reservoir through a valve which can be opened and closed as required.

5. A swashplate type variable displacement hydraulic device comprising a cylinder having a plurality of cylinder bores annularly arranged to extend in parallel with an axis of rotation and surround said axis of rotation, said cylinder being rotatable about the axis of rotation, a plurality of plungers slidably received in said cylinder bores, a swashplate having a fore surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder, wherein said swashplate holder and said swashplate anchor have surfaces opposed to each other, said opposed surfaces being formed as spherical surfaces of which a center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein said device is applied to at least one of a hydraulic pump and a hydraulic motor which together constitute a hydrostatic continuously variable transmission usable for a vehicle, said hydraulic pump leading to an engine, said hydraulic motor leading to a wheel, said hydraulic pump and said hydraulic motor being connected to each other via a closed hydraulic circuit, wherein said closed hydraulic circuit includes a hydraulic passage by way of which a suction side of said hydraulic pump is hydraulically connected to a discharge side of said hydraulic motor, and said hydraulic passage is communicated with an oil reservoir through a valve which can be opened and closed as required, further comprising means for making said closed hydraulic circuit inoperative, opening and closing of said valve being effected in association with operation of said means.

6. A swashplate type variable displacement hydraulic device comprising a cylinder having a plurality of cylinder bores annularly arranged to extend in parallel with an axis of rotation and surround said axis of rotation, said cylinder being rotatable about the axis of rotation, a plurality of plungers slidably received in said cylinder bores, a swashplate having a fore surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder, wherein said swashplate holder and said swashplate anchor have surfaces opposed to each other, said opposed surfaces being formed as spherical surfaces of which a center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein said bearing means comprises an opposing pair of races, an annular retainer interposed between said races, said retainer being formed with a plurality of pockets, and a number of annularly arranged balls to be accommodated in said pockets, each of said pockets being formed in an arcuate shape to accommodate a plurality of balls therein while maintaining a specified play as viewed in a circumferential direction of said retainer.

7. A swashplate type variable displacement hydraulic device of claim 6, wherein one of said pair of races is made integral with said swashplate and the other one is made integral with said swashplate holder.

8. A swashplate type variable displacement hydraulic device comprising a cylinder having a plurality of cylinder bores annularly arranged to extend in parallel with an axis of rotation and surround said axis of rotation, said cylinder being rotatable about the axis of rotation, a plurality of plungers slidably received in said cylinder bores, a swashplate having a fore surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder, wherein said swashplate holder and said swashplate anchor have surfaces opposed to each other, said opposed surfaces being formed as spherical surfaces of which a center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein said device is applied to at least one of a hydraulic pump and a hydraulic motor which together constitute a hydrostatic continuously variable transmission usable for a vehicle, said hydraulic pump leading to an engine, said hydraulic motor leading to a wheel, said hydraulic pump and said hydraulic motor being connected to each other via a closed hydraulic circuit, wherein said device is applied to said hydraulic motor, wherein said hydraulic pump includes a swashplate adapted to be supported by a member with the aid of bearing means, said member serving to transmit a rotational driving force from said engine, and each of the bearing means of said hydraulic motor and said hydraulic pump comprises an opposing pair of races, an annular retainer interposed between said races, said retainer being formed with a plurality of pockets, and a number of annularly arranged balls to be accommodated in said pockets, each of said pockets being formed in an arcuate shape to accommodate a plurality of balls therein while maintaining a specified play as viewed in a circumferential direction of said retainer.

9. A swashplate type variable displacement hydraulic device of claim 1, wherein an outer end of each of said plungers is formed as a semispherical end, a plurality of semispherical recesses are formed on the fore surface of said swashplate so as to be engaged with said semispherical ends of said plungers, and said swashplate is formed with a plurality of partitions between the adjacent semispherical recesses, each of said partitions being formed in a mountain-shaped contour radially projecting from the fore surface of said swashplate toward a central part of said swashplate.

10. A swashplate type variable displacement hydraulic device comprising a cylinder having a plurality of cylinder bores annularly arranged to extend in parallel with an axis of rotation and surround said axis of rotation, said cylinder being rotatable about the axis of rotation, a plurality of plungers slidably received in said cylinder bores, a swashplate having a fore surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder, wherein said swashplate holder and said swashplate anchor have surfaces opposed to each other, said opposed surfaces being formed as spherical surfaces of which a center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein said device is applied to at least one of a swashplate type hydraulic pump and a swashplate type hydraulic motor which together constitute a hydrostatic continuously variable transmission, a transmission shaft is fixed to a central part of a cylinder block which is formed by integrating a pump cylinder of said swashplate hydraulic pump with a motor cylinder of said swashplate type hydraulic motor, an annular inner oil passage and an annular outer oil passage surrounding the inner oil passage are disposed in said cylinder block around said transmission shaft, a distributing mechanism is provided in such a manner than the cylinder bores on the suction side of said pump cylinder are communicated with the cylinder bores on the exhaust side of said motor cylinder via said annular inner oil passage and the cylinder bores on the suction side of said pump cylinder are communicated with the cylinder bores on the expansion side of said motor cylinder via said annular outer oil passage, and said cylinder block is provided with a pressure regulating valve adapted to be opened in response to an increase of hydraulic pressure in excess of a value specified for said annular outer oil passage so as to permit said annular outer oil passage to be opened to the outside of said cylinder block.

11. A swashplate type variable displacement hydraulic device comprising a cylinder having a plurality of cylinder bores annularly arranged to extend in parallel with an axis of rotation and surround said axis of rotation, said cylinder being rotatable about the axis of rotation, a plurality of plungers slidably received in said cylinder bores, a swashplate having a fore surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder, wherein said swashplate holder and said swashplate anchor have surfaces opposed to each other, said opposed surfaces being formed as spherical surfaces of which a center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein said device is applied to at least one of a hydraulic pump and a hydraulic motor which together constitute a hydrostatic continuously variable transmission usable for a vehicle, said hydraulic pump leading to an engine, said hydraulic motor leading to a wheel, said hydraulic pump and said hydraulic motor being connected to each other via a closed hydraulic circuit, wherein said engine has a crankshaft which is operatively connected to said hydraulic pump via power transmitting means, and said crankshaft is operatively connected further with a kick type starter.

12. A swashplate type variable displacement hydraulic device of claim 11, wherein said kick type starter comprises a kick shaft rotatably supported on a casing of said engine and connected at one of opposite ends thereof with a kick pedal, a carrier operatively associated with the other end of said kick shaft, a plurality of planetary gears rotatably supported on said carrier, a ring gear meshing with said planetary gears while surrounding the latter, said ring gear being fixedly secured to said casing, a sun gear meshing with said planetary gears in a manner surrounded by them, said sun gear being slidable in an axial direction thereof and including a driving ratchet at one end thereof, a thrust spring for normally biasing said driving ratchet in a direction of advancement to bring the ratchet in engagement with a driven ratchet which leads to said crankshaft of the engine, and a cam mechanism for displacing said sun gear in a forward direction under the effect of resilient force of said thrust spring at the time of forward movement of said kick shaft and displacing the sun gear in a backward direction against the resilient force of said thrust spring at the time of backward movement of said kick shaft.

13. A swashplate type variable displacement hydraulic device of claim 1 further comprising an adjusting device for adjusting an inclination angle of said swashplate about said trunnion axis, said adjusting device including an electric motor and a ball-nut mechanism for transmitting a rotational force generated by said electric motor as a force for turning said swashplate holder about said trunnion axis.

14. A swashplate type variable displacement hydraulic device of claim 13, wherein a transmission shaft is provided in parallel with a rotational axis of said cylinder, and said ball-nut mechanism includes a screw shaft extending in parallel with said transmission shaft.

15. A swashplate type variable displacement hydraulic device of claim 2, wherein said closed hydraulic circuit includes a pair of oil passages by way of which said hydraulic pump is communicated with said hydraulic motor, one of said hydraulic passages being communicated with a hydraulic pressure source via a pair of check valves disposed in parallel with one another.

16. A swashplate type variable displacement hydraulic device comprising a cylinder having a plurality of cylinder bores annularly arranged to extend in parallel with an axis of rotation and surround said axis of rotation, said cylinder being rotatable about an axis of rotation, a plurality of plungers slidably received in said cylinder bores, a swashplate having a fore surface against which surface outer ends of said plungers abut, a swashplate holder adapted to support a back surface of said swashplate via bearing means, said swashplate holder being disposed to be turnable about a trunnion axis which intersects the axis of rotation at right angles, and a stationary swashplate anchor for supporting said swashplate holder, wherein said swashplate holder and said swashplate anchor have surfaces opposed to each other, said opposed surfaces being formed as spherical surfaces of which a center is located at a position where the axis of rotation intersects said trunnion axis, said swashplate holder having a pair of trunnion shafts projected from opposite ends thereof, said trunnion shafts extending along the trunnion axis, and recesses with which said trunnion shafts are rotatably engaged being provided on opposite ends of said swashplate anchor, wherein said bearing means comprises an angular contact ball bearing which includes an opposing pair of races and a number of balls interposed between said races, one of said races being made integral with one of opposite surfaces of said swashplate, the other surface being formed with a plurality of semispherical recesses thereon with which semispherical ends of said plungers are engaged.

17. A swashplate type variable displacement hydraulic device of claim 1, wherein said device is applied to at least one of a swashplate type hydraulic pump and a swashplate type hydraulic motor which together constitute a hydrostatic continuously variable transmission, a pump cylinder of said swashplate type hydraulic pump and a motor cylinder of said swashplate type hydraulic motor are rotatably supported on a transmission shaft, and radial flange means for supporting in the axial direction a member adapted to support a swashplate for one of said hydraulic pump and said hydraulic motor is made integral with said transmission shaft.

18. A swashplate type variable displacement hydraulic device of claim 1 further comprising a transmission shaft extending through said swashplate, said swashplate holder and said swashplate anchor, wherein the anchor is fixedly secured to a casing and is supported on said transmission shaft against axial movement.

19. A swashplate type variable displacement hydraulic device of claim 3, wherein said closed hydraulic circuit includes a hydraulic passage by way of which a suction side of said hydraulic pump is hydraulically connected to a discharge side of said hydraulic motor, and said hydraulic passage is communicated with an oil reservoir through a valve which can be opened and closed as required.

20. A swashplate type variable displacement hydraulic device of claim 3, wherein said closed hydraulic circuit includes a pair of oil passages by way of which said hydraulic pump is communicated with said hydraulic motor, one of said hydraulic passages being communicated with a hydraulic pressure source via a pair of check valves disposed in parallel with one another.

* * * * *